US012125342B2

(12) United States Patent
Gong et al.

(10) Patent No.: US 12,125,342 B2
(45) **Date of Patent: *Oct. 22, 2024**

(54) TRACKING LOCATIONS OF ANONYMOUS PLAYERS

(71) Applicant: IGT, Las Vegas, NV (US)

(72) Inventors: Wei Gong, Beijing (CN); Rong Fu, Beijing (CN); Aleksandar Jovkovic, Las Vegas, NV (US); Fei Yi, Beijing (CN)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/238,938

(22) Filed: Aug. 28, 2023

(65) Prior Publication Data

US 2023/0410595 A1 Dec. 21, 2023

Related U.S. Application Data

(63) Continuation of application No. 17/222,574, filed on Apr. 5, 2021, now Pat. No. 11,783,668.

(60) Provisional application No. 63/009,154, filed on Apr. 13, 2020.

(51) Int. Cl.
*G07F 17/32* (2006.01)

(52) U.S. Cl.
CPC ...... *G07F 17/3239* (2013.01); *G07F 17/3227* (2013.01); *G07F 17/3251* (2013.01)

(58) Field of Classification Search
CPC ............. G07F 17/3239; G07F 17/3227; G07F 17/3251
See application file for complete search history.

(56) References Cited

U.S. PATENT DOCUMENTS

| | | | |
|---|---|---|---|
| 5,547,202 | A | 8/1996 | Tsumara |
| 6,234,900 | B1 | 5/2001 | Cumbers |
| 6,853,976 | B2 | 2/2005 | Tanaka |
| 7,022,017 | B1 | 4/2006 | Halbritter et al. |
| 8,301,126 | B1 | 10/2012 | Mowry |
| 8,758,102 | B2 | 6/2014 | Block et al. |
| 8,876,608 | B2 | 11/2014 | Shepherd et al. |
| 9,028,329 | B2 | 5/2015 | Graham et al. |
| 9,373,116 | B1 | 6/2016 | Kerr |
| 9,483,906 | B2 | 11/2016 | LeMay et al. |
| 9,530,277 | B2 | 12/2016 | Nelson et al. |
| 9,646,312 | B2 | 5/2017 | Lyons et al. |
| 10,026,255 | B2 | 7/2018 | LeMay et al. |
| 2002/0155887 | A1 | 10/2002 | Criss-Puszkiewicz et al. |
| 2004/0093289 | A1 | 5/2004 | Bodin |
| 2005/0124407 | A1 | 6/2005 | Rowe |
| 2005/0192086 | A1 | 9/2005 | Walker |
| 2007/0060358 | A1 | 3/2007 | Amaitis |

(Continued)

FOREIGN PATENT DOCUMENTS

| | | |
|---|---|---|
| WO | WO2007087459 | 8/2007 |
| WO | WO2014029921 | 2/2014 |

OTHER PUBLICATIONS

Casino Journal, Top 20 Most Innovative Gaming Technology Awards 2017, www.casinojournal.com/articles/92043-casino-journal-top-20-most-innovative-gaming-technogy-awards-2017, dated Apr. 13, 2018, 27 pages.

*Primary Examiner* — Kevin Y Kim
(74) *Attorney, Agent, or Firm* — Neal, Gerber & Eisenberg LLP

(57) ABSTRACT

Systems and methods that utilize service order identifiers to track the location of anonymous players whom have placed service orders.

20 Claims, 6 Drawing Sheets

(56) References Cited

U.S. PATENT DOCUMENTS

| | | | |
|---|---|---|---|
| 2007/0087834 | A1 | 4/2007 | Moser et al. |
| 2007/0117623 | A1 | 5/2007 | Nelson et al. |
| 2007/0243925 | A1 | 10/2007 | LeMay et al. |
| 2008/0102957 | A1 | 5/2008 | Burman |
| 2008/0241310 | A1 | 10/2008 | Chen et al. |
| 2009/0124376 | A1 | 5/2009 | Kelly et al. |
| 2009/0264190 | A1 | 10/2009 | Davis et al. |
| 2010/0120506 | A1 | 5/2010 | Davis |
| 2012/0040744 | A1 | 2/2012 | Hoover et al. |
| 2014/0329583 | A1 | 11/2014 | Little et al. |
| 2017/0148266 | A1 | 5/2017 | Johnson |
| 2018/0089940 | A1 | 3/2018 | Petersen et al. |

FIG. 2A
FIG. 2B
BRING THIS TICKET TO ANOTHER GAMING MACHINE SO WE CAN KNOW WHERE YOU HAVE GONE AND WE CAN DELIVER YOUR ORDERED DRINK TO YOU THERE.
204a
LUCKY'S CASINO
202a
BRING THIS TICKET TO ANOTHER GAMING MACHINE SO WE CAN KNOW WHERE YOU HAVE GONE AND YOU CAN EARN BENEFITS FROM YOUR GAMING ACTIVITY AT THIS GAMING MACHINE.
204b
LUCKY'S CASINO
202b

1000

TRACKING LOCATIONS OF ANONYMOUS PLAYERS

PRIORITY CLAIM

This application is a continuation of, claims the benefit of and priority to U.S. patent application Ser. No. 17/222,574, filed on Apr. 5, 2021, which claims the benefit of and priority to U.S. Provisional Patent Application No. 63/009,154, filed on Apr. 13, 2020, the entire contents of which are each incorporated by reference herein.

BACKGROUND

In various embodiments, the system and method of the present disclosure utilizes anonymous player identifiers, such as outstanding action identifiers (e.g., service order identifiers) and gaming session identifiers to track the location of anonymous players.

Gaming machines may provide players awards in primary games. Gaming machines generally require the player to place a wager to activate the primary game. The award may be based on the player obtaining a winning symbol or symbol combination and on the amount of the wager.

BRIEF SUMMARY

In certain embodiments, the present disclosure relates to a system including a processor, and a memory device that stores a plurality of instructions. When executed by the processor, the instructions cause the processor to associate a task with a first electronic gaming machine, the task being requested by an unidentified player at the first electronic gaming machine. When executed by the processor responsive to an occurrence of a termination event at the first electronic gaming machine prior to a completion of the task, the instructions cause the processor to disassociate the task from being associated with the first electronic gaming machine, cause an identification of the task to become available to the unidentified player, and responsive to the unidentified player associating the identification of the task with a second electronic gaming machine, associate the task with the second electronic gaming machine.

In certain embodiments, the present disclosure relates to a system including a processor, and a memory device that stores a plurality of instructions. When executed by the processor, the instructions cause the processor to track an activity occurring at a first electronic gaming machine, the tracked activity being associated with an unidentified player at the first electronic gaming machine. When executed by the processor responsive to an occurrence of a termination event at the first electronic gaming machine, the instructions cause the processor to cause an identification of the tracked activity to become available to the unidentified player, and responsive to the unidentified player associating the identification of the tracked activity with a second electronic gaming machine, cause a modification of the second electronic gaming machine, the modification being based on the tracked activity occurring at the first electronic gaming machine.

In certain embodiments, the present disclosure relates to a method of operating a system including associating, by a processor, a task with a first electronic gaming machine, the task being requested by an unidentified player at the first electronic gaming machine. The method further includes, responsive to an occurrence of a termination event at the first electronic gaming machine prior to a completion of the task, disassociating by the processor, the task from being associated with the first electronic gaming machine, causing an identification of the task to become available to the unidentified player, and responsive to the unidentified player associating the identification of the task with a second electronic gaming machine, associating, by the processor, the task with the second electronic gaming machine.

Additional features are described herein, and will be apparent from the following Detailed Description and the figures.

DETAILED DESCRIPTION

Figure 1A:
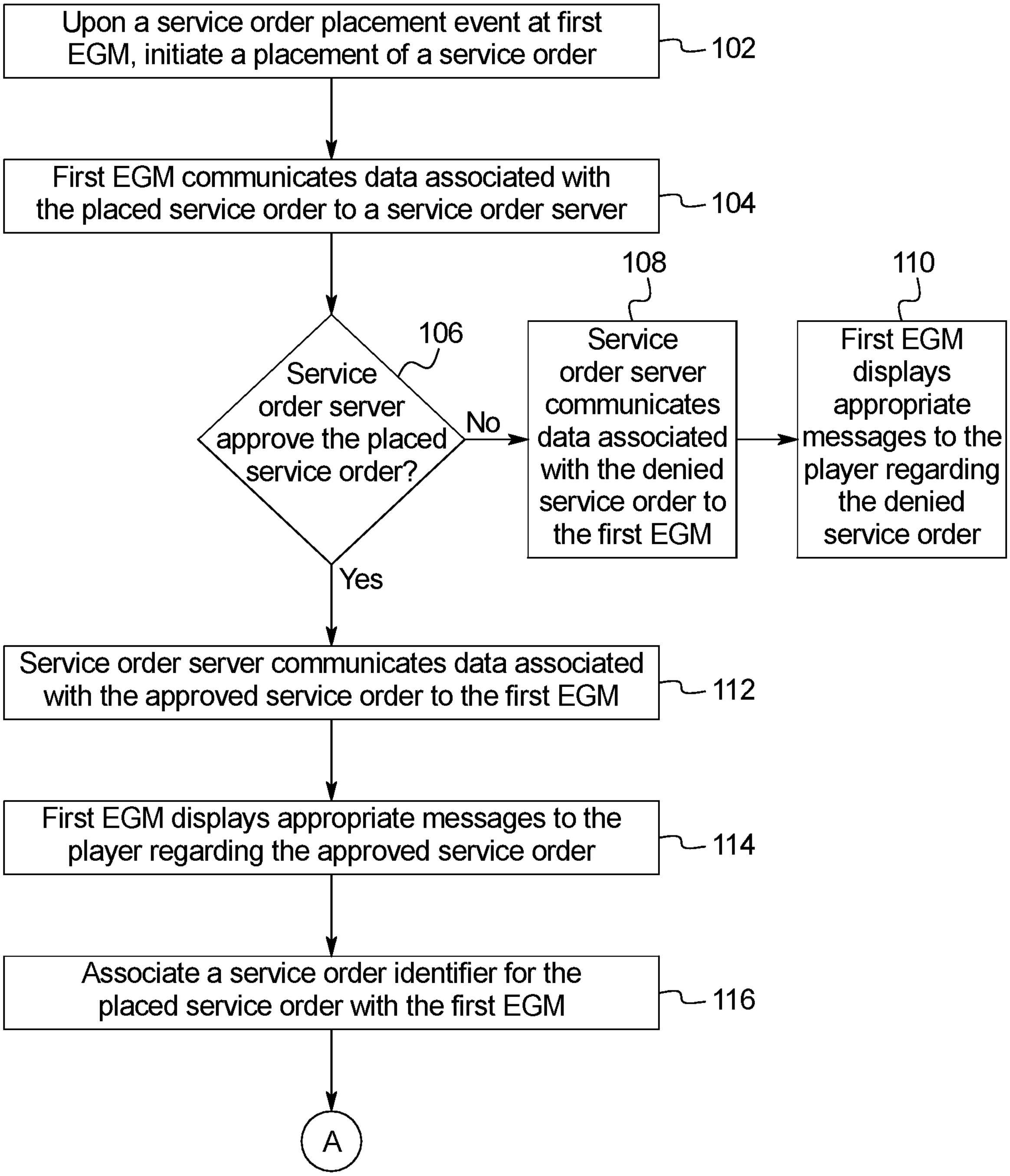
FIGS. 1A and 1B (collectively FIG. 1) are flow charts of an example process for operating a system which utilizes a service order identifier to track the location of a player whom has placed a service order at an electronic gaming machine.

In various embodiments, the system and method of the present disclosure utilizes outstanding action identifiers (e.g., service order identifiers) to track the location of anonymous players.

In certain embodiments, upon an unidentified player requesting a task or action to be completed at a first electronic gaming machine ("EGM"), such as an unidentified player placing a service order (e.g., an order for food and/or drinks delivered by gaming establishment personnel) at the first EGM and then leaving that first EGM before the requested task or action is complete (e.g., before a service order is delivered to the player by the gaming establishment personnel and designated as fulfilled by the system), the system provides the unidentified player an outstanding action identifier (e.g., a physical ticket associated with the outstanding service order). Upon the unidentified player engaging a second EGM, the unidentified player makes one or more inputs to associate the outstanding action identifier with the second EGM. Such association of the outstanding action identifier with the second EGM enables the system to update the location of the unidentified player (with regards to the outstanding task to be completed). In these embodiments, when the task is ready to be completed, such as when a placed service order is complete and ready for delivery to the unidentified player, the system notifies the appropriate gaming establishment personnel regarding the updated location of the unidentified player such that the notified gaming establishment personnel can complete the task at the second EGM, such as deliver the placed service order to the player at the second EGM (and not the first EGM).

In various embodiments, the system and method of the present disclosure additionally or alternatively utilizes gaming session identifiers to track the location of anonymous players.

In certain embodiments, upon an unidentified player participating in a gaming session at a first EGM, the system tracks the gaming session activities of that unidentified player. When the unidentified player is determined to be leaving that first EGM, the system provides the unidentified player a gaming session identifier (e.g., a physical ticket associated with the tracked gaming session activities of the unidentified player). Upon the unidentified player engaging a second EGM, the unidentified player makes one or more inputs to associate the gaming session identifier with the second EGM. In certain embodiments, such association of the gaming session identifier with the second EGM enables the system to update the location of the unidentified player (with regards to the gaming session that occurred at the first EGM) such that the system may modify the second EGM based on one or more events which occurred (or did not occur) at the first EGM. In certain other embodiments, such association of the gaming session identifier with the second EGM additionally or alternatively enables the system to update the location of the unidentified player (with regards to the gaming session that occurred at the first EGM) such that the system may cause the appropriate gaming establishment personnel to offer the unidentified player one or more benefits at the second EGM based on one or more events which occurred (or did not occur) at the first EGM.

Accordingly and unlike certain options to track which EGM an identified player is currently engaging or otherwise located at (e.g., an identified player logging into an EGM via a player tracking card or via a mobile device application associated with the identified player), to track an unidentified player, the system of the present disclosure utilizes anonymous player identifiers of an outstanding action identifier and/or a gaming session identifier to determine which EGM such an unidentified player is currently engaging or otherwise located at. Such a configuration thus enables anonymous players to take full advantage of available offerings at an EGM, thereby freeing such anonymous players from any requirements to remain at a particular EGM until a requested task is complete at that EGM, such as a placed service order is delivered at that EGM. Such a configuration further enables anonymous players to take full advantage of benefits associated with tracked game play at an EGM, thereby freeing such anonymous players from any requirements to remain at a particular EGM to receive such benefits. In other words, enabling an anonymous player to request various actions from one EGM and having those actions completed after the player has moved to another EGM frees the anonymous player up from having to be located at the same EGM (to receive the requested action at that EGM) thereby not only increasing the mobility of the player within the gaming establishment but also making the EGM where the task was requested available for another player to use. Moreover, tracking gaming session data of an anonymous player from one EGM to another EGM frees the anonymous player up from having to be located at the same EGM (to receive any benefit associated with the tracked gaming session data) thereby not only increasing the mobility of the player within the gaming establishment but also making the EGM where the tracking began available for another player to use.

In operation of certain embodiments, upon a requested task creation event, the system requests a task or action in association with an anonymous player located at a first EGM. That is, rather than limiting certain services to identified players (that the system is operable to know the location of to delivery such services), the system of the present disclosure enables unidentified players to also avail themselves of such services. In certain embodiments, a requested task creation event occurs via a player (and/or an operator of the system, such as a member of gaming establishment personnel) making one or more inputs, via one or more input devices of a gaming establishment device, such as an EGM, to access a menu of available services and select one or more services. In certain embodiments, a requested task creation event occurs via a player (and/or an operator of the system, such as a member of gaming establishment personnel) making one or more inputs via an externally controlled interface (i.e., a service window) displayed at a EGM but controlled, at least in part, by a remote host, to access a menu of available services and select one or more services. In certain embodiments, a requested task creation event occurs via a player (and/or an operator of the system, such as a member of gaming establishment personnel) making one or more inputs, via a mobile device application of a mobile device which is paired with a gaming establishment device, such as an EGM, to access a menu of available services and select one or more services. In certain embodiments, the system monitors different events which may or may not occur at the first EGM and responsive to one or more events occurring (or not occurring) at the first EGM, a requested task creation event occurs and the system automatically requests a task to be completed in association with the anonymous player.

In certain embodiments, upon the requested task creation event, the system determines the requested task, such as the system determines that a member of gaming establishment personnel is tasked with attempting to sign up the anonymous player located at the first EGM with a player tracking account. In certain embodiments, upon the requested task creation event, the anonymous player determines the requested task, such as the anonymous player orders one or more services to be delivered to the anonymous player and/or the anonymous player requests the redemption of one or more offers at the first EGM.

Figure 1B:
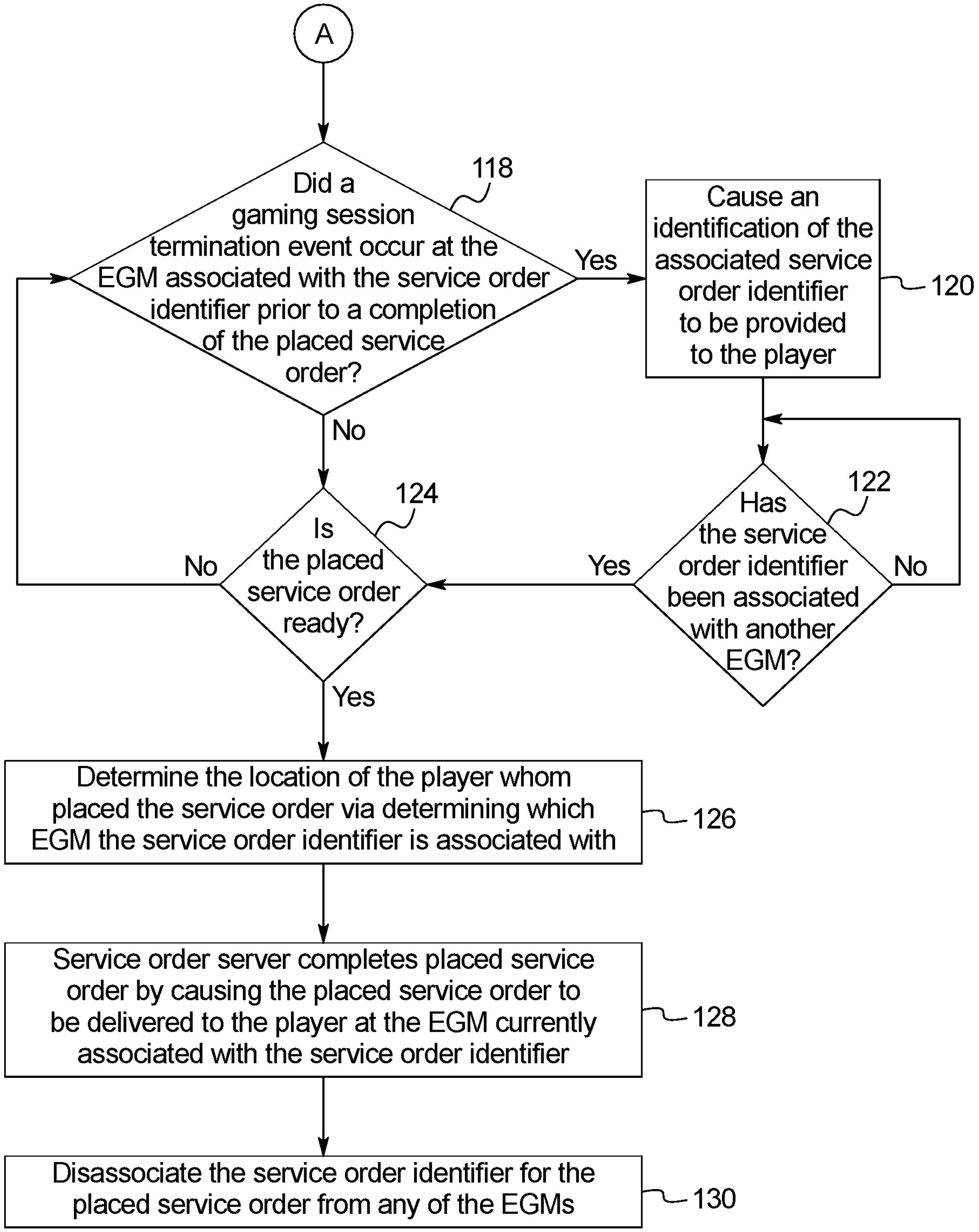

In the illustrated example of FIG. 1 wherein the task or action requested includes the placement of an order by the unidentified player, upon a service order placement event (i.e., a requested task creation event) at a first EGM, the system initiates a placement of a service order as indicated in block 102. In certain embodiments, the placed service order includes an order for a drink to be delivered to the player. In certain embodiments, the placed service order includes an order for food to be delivered to the player. In certain embodiments, the placed service order includes an order for a product to be delivered to the player, such as a product purchased by a gaming establishment concierge service which is then delivered to the player. In certain embodiments, the placed service order includes an order for a service (or a voucher to obtain a service) to be delivered to the player. In certain embodiments, the placed service order includes a request to be visited by a member of gaming establishment personnel. It should be appreciated that any suitable good and/or service which is capable of being ordered from an EGM and delivered to a player at an EGM may be implemented in accordance with the system of the present disclosure. It should be further appreciated that while the illustrated embodiment of FIG. 1 utilizes the task of a service order being placed, any suitable task created by the system and/or requested by the anonymous player may be utilized in association with the system of the present disclosure.

In certain embodiments wherein the requested task creation event occurs in association with one or more inputs received at the first EGM, following the occurrence of the requested task creation event, the first EGM communicates data associated with the requested task or action to one or more servers for processing. In the illustrated example of FIG. 1 wherein the requested task includes a placed service order, following the occurrence of the service order placement event, the first EGM communicates data associated with the placed service order to a service order server (or other gaming establishment component tasked with completing the placed service order) as indicated in block 104. In one such example, if the placed service order includes the player ordering a drink to be delivered to the player, the system communicates data associated with the drink order to a gaming establishment component, such as a food and beverage ordering server operating with a gaming establishment food and beverage system. In this example, the data communicated to the drink order server includes, but is not limited to, the type of drink, any drink options selected by the user, a delivery location of the ordered drink (i.e., the location of the ordering EGM), a cost of the ordered drink, and how the ordered drink will be paid for. In another example, if the placed service order includes the player ordering a product to be delivered to the player and/or requesting a visit from a member of gaming establishment personnel, the system communicates data associated with the ordered product to a gaming establishment component, such as a gaming establishment personnel management server or a concierge server operating with a gaming establishment concierge system.

In certain embodiments wherein the requested task creation event occurs in association with one or more inputs received at the first EGM, following the occurrence of the requested task creation event, a component of a gaming establishment management system, such as a slot machine interface board, located inside the first EGM (i.e., a component of the EGM)) communicates data associated with the requested task or action to one or more servers for processing (or other gaming establishment component tasked with processing the requested task or action). In certain embodiments wherein the requested task creation event occurs automatically or otherwise independent of any inputs received at the first EGM, following the occurrence of the task creation event, the system which created the requested task communicates data associated with the requested task or action to one or more servers for processing.

In certain embodiments, upon receiving data associated with the requested task or action, one or more servers determine whether or not to approve the requested task. That is, upon the system and/or anonymous player attempting to create a task associated with the first EGM, one or more gaming establishment components determine whether or not to add the requested task to the queue of tasks needed to be completed by the appropriate gaming establishment personnel. For example, as seen in diamond 106 of the illustrated embodiment of FIG. 1, following the service order server receiving the data associated with the placed service order, the service order server (or other gaming establishment component tasked with completing the placed service order) determines whether or not to approve the placed service order.

In certain embodiments, the determination of whether or not to approve the requested task is based on the gaming establishment component operating with one or more other gaming establishment components to determine whether or not the requested task is capable of being approved and completed. In one example wherein the requested task includes a request by the anonymous player to be visited by a member of gaming establishment personnel to redeem an offer, the system operates with a gaming establishment personnel management server to determine if the appropriate member of gaming establishment personnel are available to visit the player to redeem the offer. In another example wherein the requested task includes a placement of a drink order by the anonymous player, upon receiving data regarding the drink order, the drink order server determines whether or not to approve the requested drink order based on receiving data from a food and beverage server regarding an availability of ingredients of the ordered drink. In another example wherein the requested task includes a placement of a drink order, upon receiving data regarding the drink order, the drink order server determines whether or not to approve the placed drink order based on receiving data from a patron management server tracking wagering activity of the anonymous player regarding whether or not the player is required to pay for the ordered drink (i.e., has the unidentified player earned a complimentary drink based on their wagering activity at the EGM). In another example wherein the requested task includes a placement of a drink order, upon receiving data regarding the drink order, the drink order server determines whether or not to approve the placed drink order based on receiving data from the first EGM regarding an adequate amount of a credit balance of the EGM to cover the cost associated with the ordered drink.

In certain embodiments, if the requested task is denied as being unable to be completed, the system notifies the anonymous player (and/or an operator of the system, such as a member of gaming establishment personnel) that requested the task that the task will not be completed at this time. In the illustrated example of FIG. 1 wherein the requested task includes a placed service order, if the placed service order is denied, as indicated in blocks 108 and 110, the service order server (or other gaming establishment component tasked with completing the placed service order) communicates data associated with the denied service order to the first EGM which proceeds to display appropriate messages to the player regarding the denied service order.

On the other hand, if the requested task is approved as being able to be completed, the system notifies the anonymous player (and/or an operator of the system, such as a member of gaming establishment personnel) that requested the task with information regarding the task to be completed. In the illustrated example of FIG. 1 wherein the requested task includes a placed service order, if the placed service order is approved, as indicated in blocks 112 and 114, the gaming establishment component communicates data associated with the approved service order to the first EGM which proceeds to display appropriate messages to the player regarding the approval of the service order. For example, the EGM where the service order was placed provides appropriate messages such as "YOUR DRINK ORDER SHOULD BE AVAILABLE SHORTLY. IF YOU LEAVE BEFORE YOUR DRINK ORDER ARRIVES, DON'T FORGET TO OBTAIN A TICKET TO RECEIVE YOUR DRINK AT ANOTHER GAMING MACHINE" to the player visually, or through suitable audio or audiovisual displays. In certain embodiments, in addition to displaying appropriate messages to the player regarding the approval of the placed service order, the system causes the EGM to provide a receipt for the placed service order.

In another example wherein the requested task includes the system tasking a member of gaming establishment personnel to interact with the anonymous player at an EGM, such as visit the anonymous player at a first EGM to sign the player up to be a member of a player tracking club to earn player tracking points for the player's wagering activity, the gaming establishment personnel management server first determines the appropriate gaming establishment personnel to assign the requested task. In this example, the system determines the appropriate gaming establishment personnel based on various factors such as: (i) gaming establishment personnel experience (e.g., is the approved task better handled by a slot technician or a player customer service representative), (ii) gaming establishment personnel status (e.g., is the player customer service representative available, busy, or soon to be available), and/or (iii) a location of the gaming establishment personnel (as determined via a location tracking technology, such as a global positioning system module of a mobile client of the gaming establishment personnel). In this example, following the determination of the appropriate gaming establishment personnel to complete the approved task, the gaming establishment personnel management server notifies the gaming establishment personnel of their assigned task, such as by communicating data to the mobile client of the gaming establishment personnel to display: (i) one or more messages regarding the assigned task, (ii) a location of the EGM where the anonymous player is currently located at, and/or (iii) a picture of the anonymous player (such as captured by a camera of the first EGM and/or a gaming establishment security camera located in proximity to the first EGM).

In certain embodiments wherein the requested task includes the system tasking a member of gaming establishment personnel to interact with the anonymous player at an EGM, in addition to notifying a mobile client of the gaming establishment personnel of the created task, the system causes the EGM where the anonymous player is currently located to modify one or more output devices to enable the gaming establishment personnel to more easily locate the anonymous player. For example, once a task is created, the system communicates data to an EGM which results in the EGM turning on/off (or blinking) one or more lights, such as a light in a candle of the EGM or displaying one or more messages via an upper display device of the EGM. It should be appreciated that if the system determines, as described below, that the anonymous player has left the EGM, the system communicates data to the EGM to cease utilizing such one or more output devices to notify gaming establishment personnel. It should be further appreciated that in certain embodiments, the system automatically creates a task without first determining whether to approve or deny the creation of a task. For example, if the system determines that the task to be created includes a tasking a member of gaming establishment personnel to visit the first EGM responsive to the anonymous player at the first EGM making one or more inputs requesting a service call, the system automatically creates such a task and proceeds to determine the appropriate gaming establishment personnel to notify of the created task.

Following the creation of a task in association with an approval of a requested task (or the automatic creation of a task associated with the anonymous player at the first EGM), the system associates an outstanding action identifier with the created task. That is, since other ways of identifying the location of the player are unavailable, the system utilizes an outstanding action identifier to designate that the unidentified player associated with the created task is located at the first EGM. In the illustrated example of FIG. 1 wherein the created task includes a placed service order, following the approval of the placed service order, the system associates a service order identifier (i.e., an outstanding action identifier) for the placed service order with the first EGM as indicated in block 116.

In addition to associating the outstanding action identifier with the first EGM, the system monitors the first EGM (i.e., the EGM associated with the outstanding action identifier) to determine if any event occurred indicative of the anonymous player no longer being located at the first EGM. In these embodiments, the system determines if the created task is still outstanding and one or more events occurred (or did not occur) at the first EGM to indicate that a gaming session termination event occurred (or is predicted to soon occur) at the first EGM such that the anonymous player is no longer located at the first EGM/will no longer be located at the first EGM. In the illustrated example of FIG. 1 wherein the created task includes a placed service order placed, the system determines if a gaming session termination event occurred at the EGM associated with the service order identifier prior to a completion of the placed service order as indicated in diamond 118. That is, upon a player attempting to leave an EGM (as evidenced by the occurrence of a gaming session termination event at the EGM), the system determines whether or not any actions, such as any placed service orders, remain outstanding in association with that EGM by determining whether or not one or more action identifiers for one or more created tasks, such as one or more service order identifiers for one or more placed service orders, are currently associated with that EGM. It should be appreciated that since the player may visit multiple machines prior to a completion of the created task, the EGM associated with the outstanding action identifier may be the first EGM (i.e., the EGM where the player was located when the task was originally created) or a subsequently played EGM (i.e., an EGM not where the player was located when the task was originally created).

In certain embodiments, a gaming session termination event indicative of the player leaving/having left an EGM includes the occurrence of a cashout event wherein the player makes zero or more inputs to cashout an amount of a credit balance of the EGM. In certain embodiments, the gaming session termination event indicative of the player leaving/having left an EGM includes the occurrence of a minimal credit balance event wherein the credit balance of the EGM remains at zero (or another amount below a minimum wager amount required to play a game of the EGM) for a designated period of time. In certain embodiments, the gaming session termination event indicative of the player leaving/having left an EGM includes the anticipated occurrence of a cashout event or a minimal credit balance event wherein based on the player's behavior, the system determines that a cashout event or a minimal credit balance event is likely to occur within a designated amount of time.

In certain embodiments, if the system determines that an event, such as a gaming session termination event, occurred at the EGM associated with the outstanding action identifier prior to a completion of the created task, the system causes an identification of the associated outstanding action identifier to be provided to the player. For example, if the system determines that a gaming session termination event occurred at the EGM associated with the service order identifier prior to a completion of the placed service order, the system causes an identification of the associated service order identifier to be provided to the player as indicated in block 120 of FIG. 1.

Figure 2A:
FIG. 2A is an front view of an example service order identifier provided by a first electronic gaming machine and utilized at a second electronic gaming machine to retrieve a placed service order.

In different embodiments, the identification of the outstanding action identifier includes one or more media which may be provided to the unidentified player in physical or virtual form and which is associated with the outstanding action identifier for the created task. In one such embodiment, the identification of the outstanding action identifier includes the system causing a physical ticket associated with the outstanding action identifier to be provided to the player. For example, if the outstanding action includes a placed service order, the service order server operates with a gaming establishment ticketing system to cause the generation of a ticket (that is associated with the service order identifier for the placed service order), which is printed by a ticket printer of the EGM. In another such embodiment, the identification of the outstanding action identifier includes the system causing a virtual ticket associated with the outstanding action identifier to be provided to the player. For example, if the outstanding action includes a placed service order, the service order server operates with a gaming establishment virtual ticket system to cause the creation of a ticket (that is associated with the service order identifier for the placed service order), which is made available to the player. In another such embodiment, the identification of the outstanding action identifier includes the system causing a machine readable code associated with the outstanding action identifier, such as a barcode or QR code, to be provided to the player. For example, if the outstanding action includes a placed service order, the service order server operates with a gaming establishment ticketing system to cause the creation of a machine readable code (that is associated with the service order identifier for the placed service order), which is provided to the player via a ticket printed by the EGM or via a machine readable barcode capture device, such as a camera or a QR code reader of the player's mobile device. For example, as seen in FIG. 2A, upon the occurrence of a gaming session termination event, the system causes the player's currently occupied EGM to dispense a physical ticket 202*a* with a barcode code 204*a* wherein the physical ticket is associated with the service order identifier maintained by the system in association with the outstanding incomplete placed service order.

In certain embodiments, the identification of the outstanding action identifier is independent of any ticket vouchers dispensed by the EGM which are associated with monetary funds. In these embodiments, the EGM is thus configured to dispense at least two different types of ticket vouchers: one associated with monetary funds as part of a ticket-in ticket-out system and one associated with a created task that was not completed prior to the gaming session termination event. In certain other embodiments, the identification of the outstanding action identifier is combinable with one or more other ticket vouchers dispensed by the EGM. In these embodiments, the EGM is thus configured to dispense a universal ticket voucher which is both associated with monetary funds as part of a ticket-in ticket-out system and a task that was not completed prior to the gaming session termination event.

In various embodiments, if a player has indicated that they want to leave an EGM (such as via an occurrence of a cashout event) or if the system determines that a player is about to leave an EGM (such as via an occurrence of a minimal credit balance event) after a task has been created but not completed (such as after the player placed an order at that EGM but before the order has been delivered to the player at the EGM), the system disassociates the outstanding action identifier for the created task from the EGM which the player is leaving and, as indicated above, provides the unidentified player a way to identify themselves as the player associated with the incomplete task to another gaming establishment component, such as another EGM. It should be appreciated that the term "EGM" is used herein to refer to any suitable electronic gaming machine which enables a player place one or more wagers, play one or more games, place one or more sporting event wagers and/or place one or more orders of one or more goods and/or services, wherein the EGM comprises, but is not limited to: a slot machine, a video poker machine, a video lottery terminal, a terminal associated with an electronic table game, a terminal associated with a gaming table, a video keno machine, a video bingo machine, a sports betting terminal, or a kiosk. It should be further appreciated that while described as utilizing an outstanding action identifier to track an anonymous player's location from EGM to EGM, such outstanding action identifiers may also be used to track an anonymous player's location as it pertains to any suitable gaming establishment device located in a gaming establishment, such as a point-of-sale terminal located in a retail area of a gaming establishment. As such, the system of the present disclosure is configured to create a task in association with an unidentified player at a first gaming establishment device and have that task ultimately completed at a different type of gaming establishment device or a different instance of the same type of gaming establishment device.

Following the player obtaining an identification of the outstanding action identifier, the system determines if the outstanding action identifier has been associated with another EGM. That is, following the termination of a gaming session at one EGM, the system determines whether or not the player has initiated a gaming session (or otherwise undertaken one or more activities) at another EGM and in doing so, the player has associated or otherwise presented the outstanding action identifier to that other EGM. In the illustrated example of FIG. 1 wherein the created task includes a placed service order, following the player obtaining an identification of the service order identifier, the system determines if the service order identifier has been associated with another EGM as indicated in diamond 122.

In one such embodiment wherein the identification of the outstanding action identifier is in the form of a physical ticket, the player associates the outstanding action identifier with another EGM by inserting the physical ticket into a ticket reader of the other EGM. In one such embodiment wherein the identification of the outstanding action identifier is in the form of a machine readable code, the player associates the outstanding action identifier with another EGM by scanning the machine readable code at the other EGM.

It should be appreciated that until the system associates the outstanding action identifier with another EGM, the system continues to monitor for any association of the outstanding action identifier with another EGM. As such, since the system has no other way to identify where the uncarded and unidentified player may have gone to and thus the system has no viable location wherein to complete a task associated with an unidentified player, such as where to deliver a placed order to, the system simply waits for the player to engage another EGM (or gaming establishment component) and provide their location via associating the outstanding action identifier with the other EGM. In the illustrated example of FIG. 1 wherein the created task includes a placed service order, if the system determines that no service order identifier has been associated with another EGM, the system returns to diamond 122 and awaits for the service order identifier to be associated with another EGM.

In various embodiments, following the association of the outstanding action identifier with the other EGM or upon the system determining that no gaming session termination event occurred in association with the EGM associated with the outstanding action identifier prior to a completion of the task, the system determines if the task is ready to be completed. That is, upon a determination that the unidentified player has either remained at one EGM or alternatively left one EGM but indicated to the system, via the provided outstanding action identifier, that they are now at another EGM, the system determines whether the requested task is ready to be completed, such as delivered to the player at the current EGM. In the illustrated example of FIG. 1 wherein the created task includes a placed service order, following the association of the service order identifier with the other EGM or if the system determines that no gaming session termination event occurred in association with the EGM associated with the service order identifier prior to a completion of the placed service order, the system determines if the placed service order is ready as indicated in diamond 124.

If the system determines that the requested task is not ready to be completed, the system continues to monitor for whether or not any gaming session termination event occurred in associated with the EGM associated with the outstanding action identifier. In other words, the system is configured to periodically monitor whether or not the player has left the EGM (via the occurrence or lack thereof of a gaming session termination event) while awaiting for the requested task to be completed. For example, if the system tasked an identified member of gaming establishment personnel to visit an unidentified player at an EGM and offer the unidentified player one or more benefits in exchange for opening a player tracking account, but the system also determines that the identified member of gaming establishment personnel is not available, such as due to being on break or fulfilling another obligation, the system continues to monitor activities of the EGM associated with the outstanding action identifier. In another example wherein the created task includes a placed service order, if the system determines that the placed service order is not ready, the system returns to diamond 118 of FIG. 1 and again determines if a gaming session termination event occurred at the EGM associated with the service order identifier prior to a completion of the placed service order.

If the system determines that the requested task is ready to be completed, the system determines the location of the anonymous player via determining which EGM the outstanding action identifier is associated with. Following this determination of the location of the anonymous player via tracking which EGM is currently associated with the outstanding action identifier, the system completes (or causes the completion of) the task and disassociates the outstanding action identifier for the task from any of the EGMs. In certain such embodiments, the system facilitates the completion of the task by communicating data to the gaming establishment personnel management server regarding the location of the anonymous player which in turn communicates updated anonymous player location information to the mobile client of the gaming establishment personnel assigned to complete the outstanding task. In certain other embodiments, the system facilitates the completion of the task by additionally or alternatively communicating data to the EGM currently associated with the outstanding action identifier to cause that EGM to update one or more output devices to enable the gaming establishment personnel to more easily locate the anonymous player. In these embodiments, upon the completion of the task, the gaming establishment personnel makes one or more inputs, via the EGM currently associated with the outstanding action identifier, via a service window displayed by the EGM currently associated with the outstanding action identifier and/or via the gaming establishment personnel's mobile client, to cause the output device of the EGM to cease operating to gain the attention of the gaming establishment personnel.

For example, as seen in the illustrated example of FIG. 1, if the placed service order is ready, the system determines the location of the player whom placed the service order via determining which EGM the service order identifier is associated with as indicated in block 126. Following this determination of the player, the service order server (or other gaming establishment component tasked with completing the placed service order) completes the placed service order by causing the placed service order to be delivered to the player at the EGM currently associated with the service order identifier as indicated in block 128. Following the completion of the placed service order, such as following the fulfillment of the placed service order, the system disassociates the service order identifier for the placed service order from any of the EGMs as indicated in block 130. In this example, when an ordered drink is ready, the system first determines which EGM the unidentified player is currently located at (by determining which EGM is currently associated with the service order identifier associated with the ordered drink) and then the system communicates data to one or more gaming establishment components to cause the ordered drink to be delivered, such as by causing one or more mobile clients and/or display devices located in a gaming establishment bar to inform gaming establishment wait staff where the ordered drink is to be delivered.

Figure 4A:
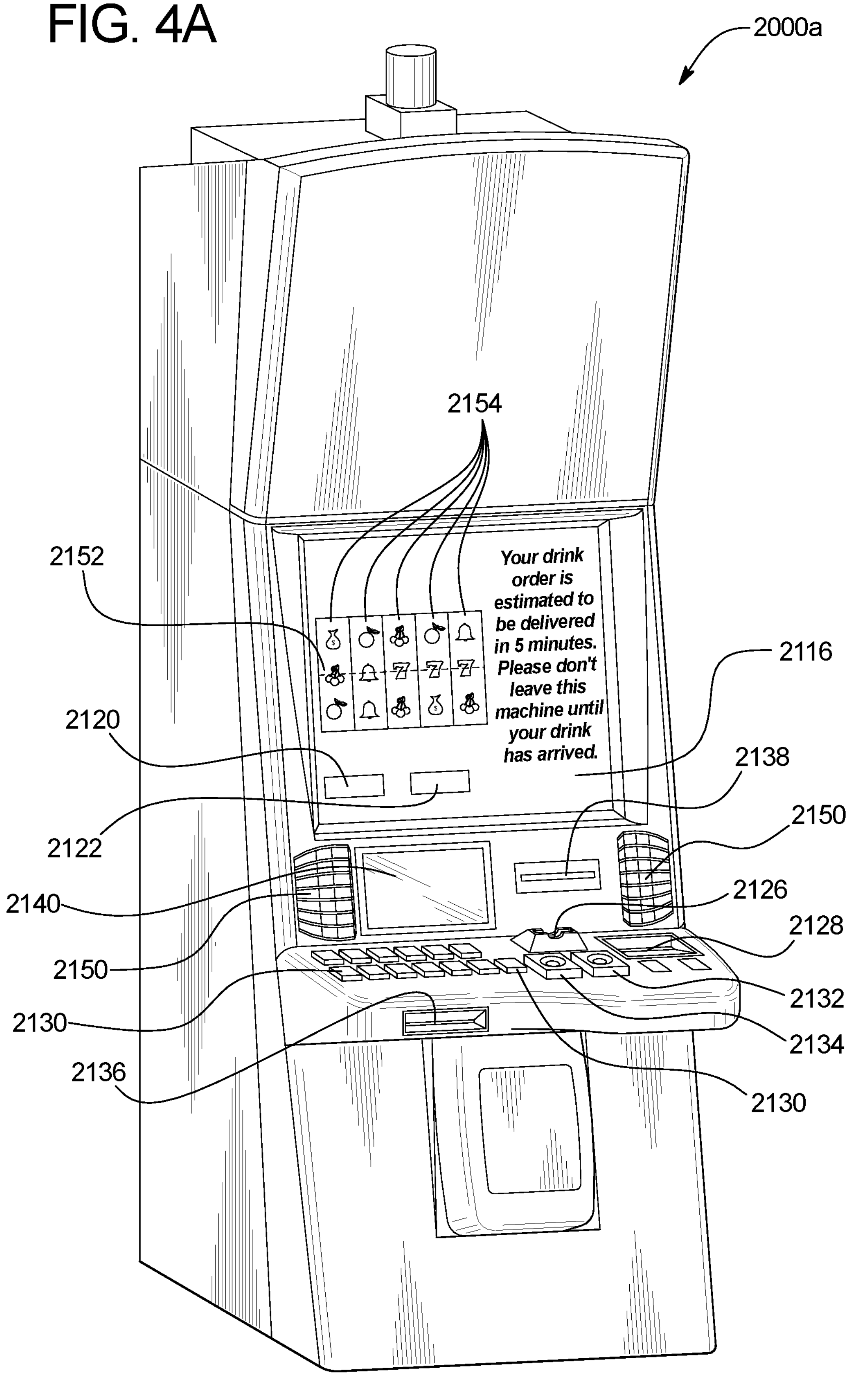
FIGS. 4A and 4B are perspective views of example alternative embodiments of the gaming system of the present disclosure.

In certain embodiments, in addition to utilizing outstanding action identifiers to track the whereabouts of anonymous players (with respect to the completion of tasks and/or services to be delivered to the anonymous player), upon the system creating and approving a task, such as the service order server (or other gaming establishment component tasked with completing the placed service order) approving the placed service order, the system determines an estimated task completion time, such as a service order delivery time. In these embodiments, the determined estimated task completion time is based on one or more factors such as the location of the EGM where the task was initially requested, the task requested, and a current processing time to complete similar requested tasks. The system then compares the determined estimated task completion time against a player time threshold to determine whether to inform the player to remain at the EGM until completion of the task or to remind the player to obtain an outstanding action identifier if the player departs the EGM prior to completion of the requested task. For example, upon the approval of an ordered drink, if the drink order server contacts a food and beverage server to determine that based on the volume of current outstanding drink orders, the estimated delivery time of the ordered drink is in five minutes, as seen in FIG. 4A, the EGM where the service order was placed provides appropriate messages such as "YOUR DRINK ORDER IS ESTIMATED TO BE DELIVERED IN 5 MINUTES. PLEASE DON'T LEAVE THIS MACHINE UNTIL YOUR DRINK HAS ARRIVED" to the player visually, or through suitable audio or audiovisual displays. In another example, upon the approval of an ordered drink, if the drink order server contacts a food and beverage server to determine that based on the volume of current outstanding drink orders, the estimated delivery time of the ordered drink is in thirty minutes, the EGM where the service order was placed provides appropriate messages such as "YOUR DRINK ORDER IS ESTIMATED TO BE DELIVERED IN 30 MINUTES. IF YOU LEAVE BEFORE YOUR DRINK ORDER ARRIVES, DON'T FORGET TO PRINT OUT A DRINK TICKET WHICH YOU CAN INSERT INTO ANOTHER GAMING MACHINE AND YOUR DRINK ORDER WILL BE DELIVERED THERE" to the player visually, or through suitable audio or audiovisual displays.

In certain embodiments, the system causes an identification of the associated outstanding action identifier to be provided to the player upon a determination that a gaming session termination event occurred at the EGM associated with the outstanding action identifier prior to a completion of the requested task. In certain embodiments, the system causes an identification of the associated outstanding action identifier to be provided to the player upon the creation of the task. In these embodiments, rather than waiting for the unidentified player to leave the EGM where the task was initially created (which may or may not be completed at that EGM), the system provides the player the identification of the associated outstanding action identifier, such as a ticket associated with the placed service order, when the task is initially created.

In various embodiments, in addition to or alternatively from utilizing outstanding action identifiers, such as service order identifiers, to track the location of anonymous players to complete one or more tasks, the system utilizes gaming session identifiers to track the location of anonymous players to modify the operation of a second EGM based on the player's experience at a first EGM.

In certain embodiments, upon an initiation of a gaming session by an anonymous player at an EGM, the system begins collecting various data associated with an anonymous player's gaming session at the EGM. In certain embodiments, the collected data is based on one or more tracked gaming events which occur during one or more plays of one or more games at the EGM. In different embodiments, the tracked gaming events include, but are not limited to: a deposit of an amount of funds at the EGM; a placement of a wager (regardless of the wager amount); a placement of a side-wager (regardless of the side-wager amount); a wager on a number of paylines; a wager on a designated payline; a wager on a number of ways to win; a speed of play by the anonymous player; a change in a speed of play by the anonymous player; a betting pattern by the anonymous player; a change in betting pattern by the anonymous player; a change in a type of game played; an activation of a reel; a stopping of a reel, an activation of a plurality of reels; a stopping of a plurality of reels, a generation of any outcome (or a designated outcome); a generation of any outcome (or a designated outcome) associated with an award; a generation of any outcome (or a designated outcome) associated with an award over a designated value; a generation of an outcome on a designated payline; a generation of an outcome in a scatter configuration; a generation of a winning way to win; a generation of a designated symbol or symbol combination; a generation of a designated symbol or symbol combination on a designated payline; a generation of a designated symbol or symbol combination in a scatter configuration; a payment of an award amount; a triggering of a play of a secondary game; an activation of a secondary display; an activation of a community award generator; and/or a generation of any outcome (or a designated outcome) in a secondary game.

In certain embodiments, the collected data is additionally or alternatively based on zero, one or more actions taken, such as via zero, one or more inputs, which occur after one or more events which occur during one or more plays of one or more games at the EGM. For example, the collected data includes which inputs are made by the anonymous player responsive to which images are displayed to the anonymous player as well as the timing of such inputs. In another example, the collected data includes a selection of one of N in-game bonuses to play as well as any selections made by the anonymous player during the in-game bonus, the timing of such selections and the results of the in-game bonus.

In certain embodiments, the collected data is additionally or alternatively based on zero, one or more events which occur independent of any plays of any games at the EGM. For example, the collected data includes what non-gaming content was displayed to the anonymous player via a service window and when such content was displayed.

In certain embodiments, the collected data is additionally or alternatively based on zero, one or more actions taken, such as via zero, one or more inputs, which occur after one or more events which occur independent of any plays of any games at the EGM. For example, the collected data includes which inputs are made by the anonymous player responsive to which non-gaming images are displayed to the anonymous player via a service window as well as the timing of such inputs.

It should be appreciated that any suitable data associated with any suitable quantifiable event which occurs in association with the anonymous player's gaming experience at a EGM and/or any suitable quantifiable action the anonymous player takes in association with the anonymous player's gaming experience at the EGM may be collected by the system of the present disclosure. That is, data associated with any traceable input made at the EGM and/or any traceable output from the EGM which: (i) occurs in association with one or more plays of one or more primary games at the EGM, (ii) occurs in association with one or more plays of one or more secondary games at the EGM, or (iii) occurs independent of any primary games or secondary games played at the EGM; may be collected in accordance with the system of the present disclosure. It should be further appreciated that, in certain embodiments, the system utilizes such collected data to determine an estimated mood of the anonymous player wherein the system modifies how the player's played EGM operates to accommodate the determined estimated mood.

In certain embodiments, the data collected in association with the event and/or action occurring includes information regarding when the event and/or action occurred as well as the environment (e.g., game name, game type, location of EGM, manufacturer of EGM, name of gaming establishment, location of gaming establishment, type of gaming establishment) in which the event and/or action occurred. This linking data may be subsequently used by one or more servers to build a more complete picture of the anonymous player's experience at the EGM. For example, if data associated with an input made by the anonymous player during a play of a game is collected, the system also collects data including, but not limited to: the time the input was made, the name of the game the input was made in, the category of game (i.e., selection game, skill-based game) the input was made in, the manufacturer of the game in which the input was made in, and the gaming establishment in which the game was played that the input was made in.

In certain embodiments, the system associates a gaming session identifier (that is associated with the collected data of the anonymous player's gaming session at the EGM) with the first EGM. That is, similar to how the system associates an outstanding action identifier with an EGM as described above, the system of these embodiments additionally or alternatively associates data pertaining to the player's gaming session (in the form of a gaming session identifier) with the first EGM. It should thus be appreciated that since other ways of tracking one or more gaming session events of an unidentified player are unavailable, the system utilizes a gaming session identifier to track such gaming session events. It should be further appreciated that since the system may be periodically collecting additional data pertaining to the anonymous player's gaming session, the system periodically updates the gaming session identifier to reflect the most up-to-date collected data.

In addition to associating the gaming session identifier with the first EGM, the system monitors the first EGM (i.e., the EGM associated with the gaming session identifier) to determine if any event occurred indicative of the anonymous player no longer being located at the first EGM. That is, as described above, the system determines if a gaming session termination event occurred in association with the EGM being played by the anonymous player. It should be appreciated that since the player may visit multiple machines during a visit to a gaming establishment, the EGM associated with the gaming session identifier may be the first EGM (i.e., the EGM where the player was located when gaming session data was first collected) or a subsequently played EGM (i.e., an EGM not where the player was located when the gaming session data was first collected).

Figure 2B:
FIG. 2B is an front view of an example gaming session identifier provided by a first electronic gaming machine and utilized at a second electronic gaming machine to modify an operation of the second electronic gaming machine.

In certain embodiments, if the system determines that a gaming session termination event occurred at the EGM associated with the gaming session identifier, the system causes an identification of the associated gaming session identifier to be provided to the player. In different embodiments, the identification of the gaming session identifier includes one or more media which may be provided to the unidentified player in physical or virtual form and which is associated with the gaming session identifier. In one such embodiment, the identification of the gaming session identifier includes the system causing a physical ticket associated with the gaming session identifier to be provided to the player. In another such embodiment, the identification of the gaming session identifier includes the system causing a virtual ticket associated with the gaming session identifier to be provided to the player. In another such embodiment, the identification of the gaming session identifier includes the system causing a machine readable code associated with the gaming session identifier, such as a barcode or QR code, to be provided to the player. For example, as seen in FIG. 2B, upon the occurrence of a gaming session termination event, the system causes the player's currently occupied EGM to dispense a physical ticket 202*b* with a barcode code 204*b* wherein the physical ticket is associated with a gaming session identifier maintained by the system and associated with the gaming session data collected based on the player's experience at that EGM.

In certain embodiments, the identification of the gaming session identifier is independent of any ticket vouchers dispensed by the EGM which are associated with monetary funds. In these embodiments, the EGM is thus configured to dispense at least two different types of ticket vouchers: one associated with monetary funds as part of a ticket-in ticket-out system and one associated with the gaming session data collected in association with an anonymous player's activities at an EGM. In certain other embodiments, the identification of the gaming session identifier is combinable with one or more other ticket vouchers dispensed by the EGM. In these embodiments, the EGM is thus configured to dispense a universal ticket voucher which is both associated with monetary funds as part of a ticket-in ticket-out system and also associated with gaming session data collected in association with an anonymous player's activities at an EGM.

Following the player obtaining an identification of the gaming session identifier, the system determines if the gaming session identifier has been presented to or otherwise associated with another EGM. That is, following the termination of a gaming session at one EGM, the system determines whether or not the player has initiated a gaming session (or otherwise undertaken one or more activities) at another EGM and in doing so, the player has presented the gaming session identifier to that other EGM. In one such embodiment wherein the identification of the gaming session identifier is in the form of a physical ticket, the player associates the gaming session identifier with another EGM by inserting the physical ticket into a ticket reader of the other EGM. In one such embodiment wherein the identification of the gaming session identifier is in the form of a machine readable code, the player associates the gaming session identifier with another EGM by scanning the machine readable code at the other EGM. It should be appreciated that until the system associates the gaming session identifier with another EGM, the system continues to monitor for any association of the gaming session identifier with another EGM. As such, since the system has no other way to identify where the uncarded and unidentified player may have gone to, the system simply waits for the player to engage another EGM (or gaming establishment component) and provide their location via associating the gaming session identifier with the other EGM.

In various embodiments, following the association of the gaming session identifier with the other EGM, the system modifies the other EGM based on the collected gaming session data associated with the presented gaming session identifier. That is, the system alters the state or behavior of the other gaming machine to accommodate a particular unidentified player's mood as evidenced by the gaming session data collected for that player at a prior EGM. Such a configuration thus enables a gaming establishment to provide an unidentified player a consistent experience from EGM to EGM which is based on that player's prior experiences at a prior played EGM without requiring the player to identify themselves to the EGM or otherwise utilize a player tracking account.

In certain embodiments, if the system determines to modify one or more parameters of the other EGM based on the collected gaming session data associated with the presented gaming session identifier, the system modifies one or more aspects of a game available to be played at the other EGM. That is, upon an occurrence of an EGM modification event (which itself occurs based on the anonymous player's gaming experience at another EGM being carried forward to another EGM), the system modifies one or more operational parameters of the other EGM, such as modifying how one or more games of the other EGM operate.

In certain embodiments, the modified game comprises a play of a primary game, such as a wagering game, wherein a game triggering event includes the placement of a wager on the play of the primary game. In certain embodiments, the modified game comprises a play of a secondary game, such as a bonus game, wherein a game triggering event occurs based on a displayed event associated with a play of a primary game. In certain embodiments, the modified game comprises a play of a secondary game, such as a bonus game, wherein a game triggering event occurs based on a displayed event occurring in the sporting event. In certain embodiments wherein the modified game comprises a secondary game, a game triggering event occurs based on an event independent of any displayed event associated with the play of the primary game and independent of any displayed event occurring in the sporting event.

In various embodiments, the system employs any suitable game (including a wagering game, and/or a non-wagering game) for the triggered play of the modified game of the other EGM. In different embodiments, such a triggered play of a game includes, but is not limited to: a play of any suitable video or mechanical slot or reel game; a play of any suitable card game, such as but not limited to any suitable poker game, any suitable blackjack game, or any suitable Baccarat game; a play of any suitable keno game; a play of any suitable bingo game; a play of any suitable table game (whether or not such table game is occurring at a gaming table); a play of any suitable wheel game; a play of any suitable offer and acceptance game; a play of any suitable award ladder game; a play of any suitable puzzle-type game; a play of any suitable persistence game; a play of any suitable selection game; a play of any suitable cascading symbols game; a play of any suitable ways to win game; a play of any suitable scatter pay game; a play of any suitable coin-pusher game; a play of any suitable elimination game; a play of any suitable stacked wilds game; a play of any suitable trail game; a play of any suitable bingo game; a play of any suitable video scratch-off game; a play of any suitable pick-until-complete game; a play of any suitable shooting simulation game; a play of any suitable racing game; a play of any suitable promotional game; a play of any suitable high-low game; a play of any suitable lottery game; a play of any suitable number selection game; a play of any suitable dice game; a play of any suitable skill game; a play of any suitable auction game; a play of any suitable reverse-auction game; and/or a play of any suitable group game.

In certain embodiments, upon an occurrence of an EGM modification event, the system modifies one or more aspects of a paytable employed in association with the game of the other EGM. In certain embodiments, upon an occurrence of an EGM modification event, the system modifies, such as increases, one or more awards associated with one or more game outcomes. In certain embodiments, upon an occurrence of an EGM modification event, the system modifies the paytable associated with the game by modifying one or more probabilities associated with one or more game outcomes. In certain embodiments, upon an occurrence of an EGM modification event, the system activates different components of the paytable, such as which paytable categories are associated with which awards, if any. In certain embodiments, upon an occurrence of an EGM modification event, the system modifies one or more components of the paytable. In certain embodiments, rather than modifying one or more awards associated with one or more game outcomes and/or modifying one or more probabilities associated with one or more outcomes, the system selects one of a plurality of paytables to utilize upon an occurrence of an EGM modification event.

In certain embodiments, upon an occurrence of an EGM modification event, the system modifies the paytable associated with the game by activating one or more supplemental awards associated with the paytable employed for the game. In different embodiments, the supplemental awards available to be won (and/or one or more awards provided in association with a triggered play of a game at an EGM) includes, but is not limited to, one or more of: a quantity of monetary credits, a quantity of non-monetary credits, a quantity of promotional credits, a progressive award, a modifier, such as a multiplier, a quantity of free plays of one or more games, a quantity of plays of one or more secondary or bonus games, a multiplier of a quantity of free plays of a game, one or more lottery based awards, such as lottery or drawing tickets, a wager match for one or more plays of one or more games, an increase in the average expected payback percentage for one or more plays of one or more games, one or more comps, such as a free dinner, a free night's stay at a hotel, a relatively high value product such as a free car, or a relatively low value product, one or more bonus credits usable for online play, one or more coupons or promotions usable within and/or outside of the gaming establishment (e.g., a 20% off coupon for use at a convenience store), virtual goods associated with the system, virtual goods not associated with the system, an access code usable to unlock content on an internet.

In various embodiments, upon an occurrence of an EGM modification event, the system activates one or more features associated with the game. In certain embodiments, upon an occurrence of an EGM modification event, the system modifies one or more activated features associated with the game. In different embodiments, the features activated or otherwise enhanced for a game responsive to an occurrence of an EGM modification event include, but are not limited to: a feature which modifies one or more game outcomes of one or more plays of a game (e.g., the symbols evaluated for the play(s) of the game); a feature which modifies the paytable utilized for one or more plays of the game; a feature which modifies any award determined for one or more plays of the game; a feature which superimposed one or more symbols over the randomly generated symbols of the reels; a feature which replaces one or more symbols of the randomly generated symbols of the reels with a predetermined symbol pattern; a feature which replaces one or more symbols of the randomly generated symbols of the reels with a predetermined pattern of wild symbols; a book-end wild symbols feature; a stacked wild symbols feature; an expanding wild symbols feature; a nudging wild symbols feature; a retrigger symbol feature; an anti-terminator symbol feature; a locking reel feature, a locking symbol position feature; a feature which modifies a quantity of playing cards in a deck, a feature which modifies a quantity of cards available to be held in a hand of playing cards, a feature which modifies an automatic hold suggestion, a feature which provides an additional award amount to a player; a feature modifying an amount of credits of a credit balance; a feature modifying an amount of promotional credits; a feature modifying a triggering event of a play of a secondary or bonus game; a feature modifying an activation of a secondary or bonus display (such as an award generator); a feature modifying a quantity of activations of a secondary or bonus display (e.g., a feature modifying a quantity of spins of an award generator); a feature modifying a quantity of sections of a secondary or bonus display (e.g., a feature modifying a quantity of sections of an award generator); a feature modifying one or more awards of a secondary or bonus display; a feature modifying an activation of a community award generator; a feature modifying a quantity of activations of a community award generator; a feature modifying a quantity of sections of a community award generator; a feature modifying one or more awards of a community award generator; a feature modifying a generated outcome (or a designated generated outcome) in a secondary game; a feature modifying a placed wager amount; a feature modifying a placed side wager amount; a feature modifying a number of wagered on paylines; a feature modifying a wager placed on one or more paylines (or on one or more designated paylines); a feature modifying a number of ways to win wagered on; a feature modifying a wager placed on one or more ways to win (or on one or more designated ways to win); a feature modifying an average expected payback percentage of a play of a game; a feature modifying an average expected payout of a play of a game; a feature modifying one or more awards available; a feature modifying a range of awards available; a feature modifying a type of awards available; a feature modifying one or more progressive awards; a feature modifying which progressive awards are available to be won; a feature modifying an activation of a reel (or a designated reel); a feature modifying an activation of a plurality of reels; a feature modifying a generated outcome (or a designated generated outcome) on a designated payline; a feature modifying a generated outcome (or a designated generated outcome) in a scatter configuration; a feature modifying a winning way to win (or a designated winning way to win); a feature modifying a designated symbol or symbol combination; a feature modifying a generation of a designated symbol or symbol combination on a designated payline; a feature modifying a generation of a designated symbol or symbol combination in a scatter configuration; a feature modifying a quantity of picks in a selection game; a feature modifying a quantity of offers in an offer and acceptance game; a feature modifying a quantity of moves in a trail game; a feature modifying an amount of free spins provided; a feature modifying a game terminating or ending condition; a feature modifying how one or more aspects of one or more games (e.g., colors, speeds, sound) are displayed to a player; and/or a feature modifying any game play feature associated with any play of any game of the present disclosure.

Figure 4B:
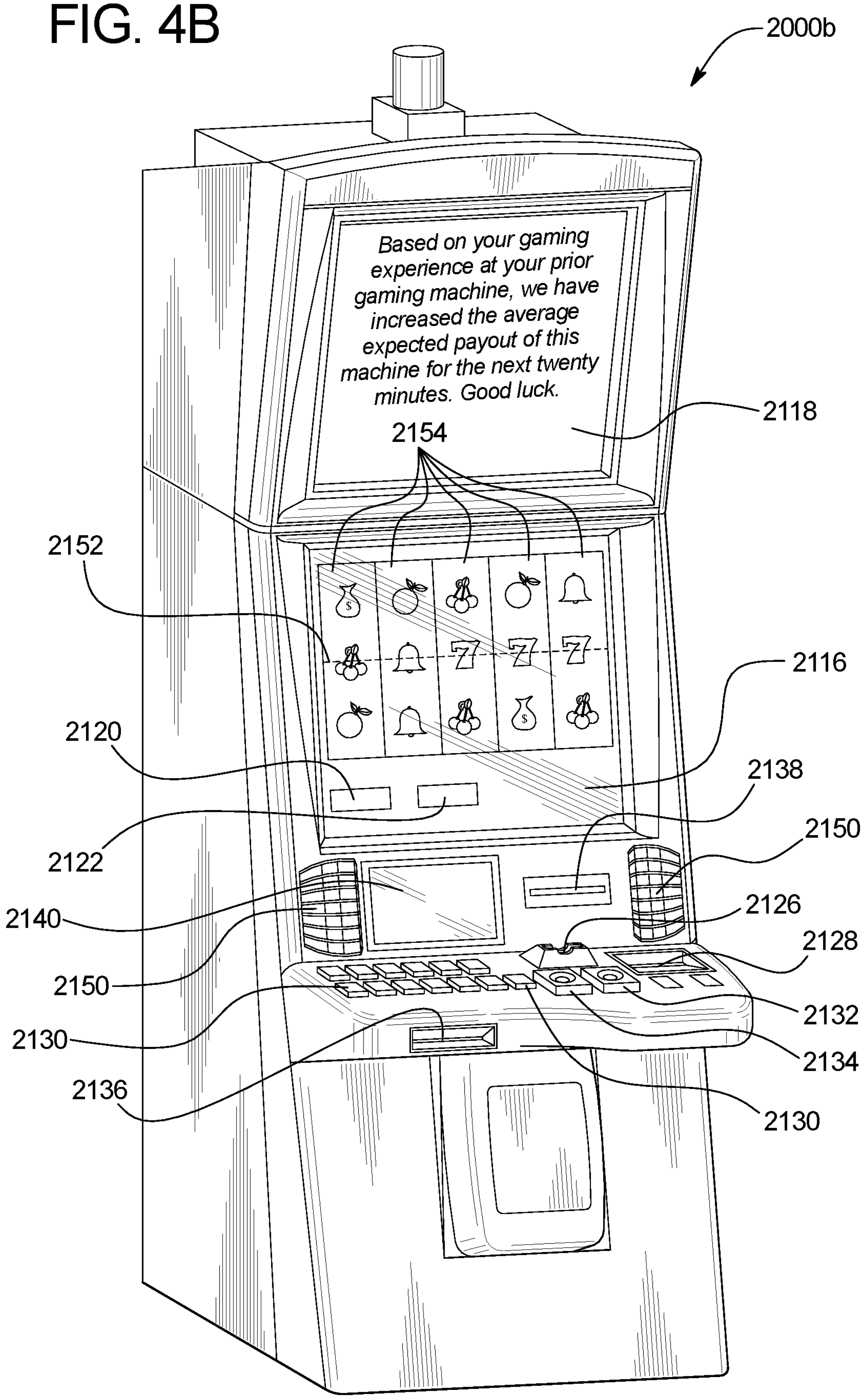

In certain embodiments, upon the system modifying the other EGM based on the presented gaming session data collected in association with the first EGM and associated with the gaming session identifier, the system notifies the anonymous player of the modification. For example, upon increasing the average expected payout of a paytable employed by the other EGM, as seen in FIG. 4B, the other EGM provides appropriate messages such as "BASED ON YOUR GAMING EXPERIENCE AT YOUR PRIOR GAMING MACHINE, WE HAVE INCREASED THE AVERAGE EXPECTED PAYOUT OF THIS MACHINE FOR THE NEXT TWENTY MINUTES. GOOD LUCK" to the player visually, or through suitable audio or audiovisual displays.

Accordingly and unlike certain options to track which EGM an identified player is currently engaging or otherwise located at (e.g., an identified player logging into an EGM via a player tracking card or via a mobile device application associated with the identified player), to track an unidentified player, the system of the present disclosure utilizes anonymous player identifiers of an outstanding action identifier and/or a gaming session identifier to determine which EGM such an unidentified player is currently engaging or otherwise located at. Such a configuration thus enables anonymous players to take full advantage of available offerings at an EGM, thereby freeing such anonymous players from any requirements to remain at a particular EGM until a requested task is complete at that EGM, such as a placed service order is delivered at that EGM. Such a configuration further enables anonymous players to take full advantage of benefits associated with tracked game play at an EGM, thereby freeing such anonymous players from any requirements to remain at a particular EGM to receive such benefits. In other words, enabling an anonymous player to request various actions from one EGM and having those actions completed after the player has moved to another EGM frees the anonymous player up from having to be located at the same EGM (to receive the requested action at that EGM) thereby not only increasing the mobility of the player within the gaming establishment but also making the EGM where the task was requested available for another player to use. Moreover, tracking gaming session data of an anonymous player from one EGM to another EGM frees the anonymous player up from having to be located at the same EGM (to receive any benefit associated with the tracked gaming session data) thereby not only increasing the mobility of the player within the gaming establishment but also making the EGM where the tracking began available for another player to use.

In certain embodiments, following the modification of the other EGM, the system retains the collected gaming session data utilized to modify the other EGM (and which may be combined with gaming session data collected from the other EGM to further customize the player's gaming experience). In certain embodiments, following the modification of the other EGM, the system deletes the collected gaming session data utilized to modify the other EGM. In certain embodiments, following the system analyzing the collected gaming session data, the system deletes the collected gaming session data utilized to modify the other EGM. In certain embodiments, the system deletes the collected gaming session data upon a determination that the anonymous player has left the gaming establishment. In certain embodiments, the system deletes the collected gaming session data after a predetermined amount of time.

In certain embodiments, in addition to or alternative from utilizing anonymous player identifiers, such as outstanding action identifiers (e.g., service order identifiers) and gaming session identifiers to track the location of anonymous players, the system utilizes one or more biometric identifiers to identify an anonymous player (based on one or more captured biometric-based factors) and track the location of the anonymous player. In one such embodiment, the system utilizes one or more fingerprint detectors configured to read a fingerprint of an anonymous player. In another such embodiment, the system utilizes one or more retinal scanners configured to scan an anonymous player's retinas. In another such embodiment, system utilizes one or more facial recognition devices configured to recognize an anonymous player's face (and determine a player's mood based on one or more facial expressions). In different embodiments, any suitable hardware, such as cameras and microphones, and specialized software can be used to capture or measure any identifying information of an anonymous player, such as but not limited to, vein detection in palms or other body components, voice recognition, handwriting analysis, keyboard or other input styles and tendencies, eye pattern movements, shapes of fingers, hands or other body parts, thermal patterns, and/or blood pressure. In such embodiments, the system utilizes such biometric identifiers to track the movements of an anonymous player within a gaming establishment to provide the player the various benefits of the present disclosure.

Gaming Systems

The above-described embodiments of the present disclosure may be implemented in accordance with or in conjunction with one or more of a variety of different types of gaming systems, such as, but not limited to, those described below.

The present disclosure contemplates a variety of different gaming systems each having one or more of a plurality of different features, attributes, or characteristics. A "gaming system" as used herein refers to various configurations of: (a) one or more central servers, central controllers, or remote hosts; (b) one or more electronic gaming machines such as those located on a casino floor; and/or (c) one or more personal gaming devices, such as desktop computers, laptop computers, tablet computers or computing devices, personal digital assistants, mobile phones, and other mobile computing devices.

Thus, in various embodiments, the gaming system of the present disclosure includes: (a) one or more electronic gaming machines in combination with one or more central servers, central controllers, or remote hosts; (b) one or more personal gaming devices in combination with one or more central servers, central controllers, or remote hosts; (c) one or more personal gaming devices in combination with one or more electronic gaming machines; (d) one or more personal gaming devices, one or more electronic gaming machines, and one or more central servers, central controllers, or remote hosts in combination with one another; (e) a single electronic gaming machine; (f) a plurality of electronic gaming machines in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity and unless specifically stated otherwise, "EGM" as used herein represents one EGM or a plurality of EGMs, "personal gaming device" as used herein represents one personal gaming device or a plurality of personal gaming devices, and "central server, central controller, or remote host" as used herein represents one central server, central controller, or remote host or a plurality of central servers, central controllers, or remote hosts.

As noted above, in various embodiments, the gaming system includes an EGM (or personal gaming device) in combination with a central server, central controller, or remote host. In such embodiments, the EGM (or personal gaming device) is configured to communicate with the central server, central controller, or remote host through a data network or remote communication link. In certain such embodiments, the EGM (or personal gaming device) is configured to communicate with another EGM (or personal gaming device) through the same data network or remote communication link or through a different data network or remote communication link.

In certain embodiments in which the gaming system includes an EGM (or personal gaming device) in combination with a central server, central controller, or remote host, the central server, central controller, or remote host is any suitable computing device (such as a server) that includes at least one processor and at least one memory device or data storage device. As further described herein, the EGM (or personal gaming device) includes at least one EGM (or personal gaming device) processor configured to transmit and receive data or signals representing events, messages, commands, or any other suitable information between the EGM (or personal gaming device) and the central server, central controller, or remote host. The at least one processor of that EGM (or personal gaming device) is configured to execute the events, messages, or commands represented by such data or signals in conjunction with the operation of the EGM (or personal gaming device). Moreover, the at least one processor of the central server, central controller, or remote host is configured to transmit and receive data or signals representing events, messages, commands, or any other suitable information between the central server, central controller, or remote host and the EGM (or personal gaming device). The at least one processor of the central server, central controller, or remote host is configured to execute the events, messages, or commands represented by such data or signals in conjunction with the operation of the central server, central controller, or remote host. One, more than one, or each of the functions of the central server, central controller, or remote host may be performed by the at least one processor of the EGM (or personal gaming device). Further, one, more than one, or each of the functions of the at least one processor of the EGM (or personal gaming device) may be performed by the at least one processor of the central server, central controller, or remote host.

In certain such embodiments, computerized instructions for controlling any games (such as any primary or base games and/or any secondary or bonus games) displayed by the EGM (or personal gaming device) are executed by the central server, central controller, or remote host. In such "thin client" embodiments, the central server, central controller, or remote host remotely controls any games (or other suitable interfaces) displayed by the EGM (or personal gaming device), and the EGM (or personal gaming device) is utilized to display such games (or suitable interfaces) and to receive one or more inputs or commands. In other such embodiments, computerized instructions for controlling any games displayed by the EGM (or personal gaming device) are communicated from the central server, central controller, or remote host to the EGM (or personal gaming device) and are stored in at least one memory device of the EGM (or personal gaming device). In such "thick client" embodiments, the at least one processor of the EGM (or personal gaming device) executes the computerized instructions to control any games (or other suitable interfaces) displayed by the EGM (or personal gaming device).

In various embodiments in which the gaming system includes a plurality of EGMs (or personal gaming devices), one or more of the EGMs (or personal gaming devices) are thin client EGMs (or personal gaming devices) and one or more of the EGMs (or personal gaming devices) are thick client EGMs (or personal gaming devices). In other embodiments in which the gaming system includes one or more EGMs (or personal gaming devices), certain functions of one or more of the EGMs (or personal gaming devices) are implemented in a thin client environment, and certain other functions of one or more of the EGMs (or personal gaming devices) are implemented in a thick client environment. In one such embodiment in which the gaming system includes an EGM (or personal gaming device) and a central server, central controller, or remote host, computerized instructions for controlling any primary or base games displayed by the EGM (or personal gaming device) are communicated from the central server, central controller, or remote host to the EGM (or personal gaming device) in a thick client configuration, and computerized instructions for controlling any secondary or bonus games or other functions displayed by the EGM (or personal gaming device) are executed by the central server, central controller, or remote host in a thin client configuration.

In certain embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a data network, the data network is a local area network (LAN) in which the EGMs (or personal gaming devices) are located substantially proximate to one another and/or the central server, central controller, or remote host. In one example, the EGMs (or personal gaming devices) and the central server, central controller, or remote host are located in a gaming establishment or a portion of a gaming establishment.

In other embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a data network, the data network is a wide area network (WAN) in which one or more of the EGMs (or personal gaming devices) are not necessarily located substantially proximate to another one of the EGMs (or personal gaming devices) and/or the central server, central controller, or remote host. For example, one or more of the EGMs (or personal gaming devices) are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs (or personal gaming devices) are located. In certain embodiments in which the data network is a WAN, the gaming system includes a central server, central controller, or remote host and an EGM (or personal gaming device) each located in a different gaming establishment in a same geographic area, such as a same city or a same state. Gaming systems in which the data network is a WAN are substantially identical to gaming systems in which the data network is a LAN, though the quantity of EGMs (or personal gaming devices) in such gaming systems may vary relative to one another.

In further embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a data network, the data network is an internet (such as the Internet) or an intranet. In certain such embodiments, an Internet browser of the EGM (or personal gaming device) is usable to access an Internet game page from any location where an Internet connection is available. In one such embodiment, after the EGM (or personal gaming device) accesses the Internet game page, the central server, central controller, or remote host identifies a player before enabling that player to place any wagers on any plays of any wagering games. In one example, the central server, central controller, or remote host identifies the player by requiring a player account of the player to be logged into via an input of a unique username and password combination assigned to the player. The central server, central controller, or remote host may, however, identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM (or personal gaming device), such as by identifying the MAC address or the IP address of the Internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the Internet browser of the EGM (or personal gaming device). Examples of implementations of Internet-based gaming are further described in U.S. Pat. No. 8,764,566, entitled "Internet Remote Game Server," and U.S. Pat. No. 8,147,334, entitled "Universal Game Server".

The central server, central controller, or remote host and the EGM (or personal gaming device) are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs (or personal gaming devices) to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

EGM Components

Figure 3:
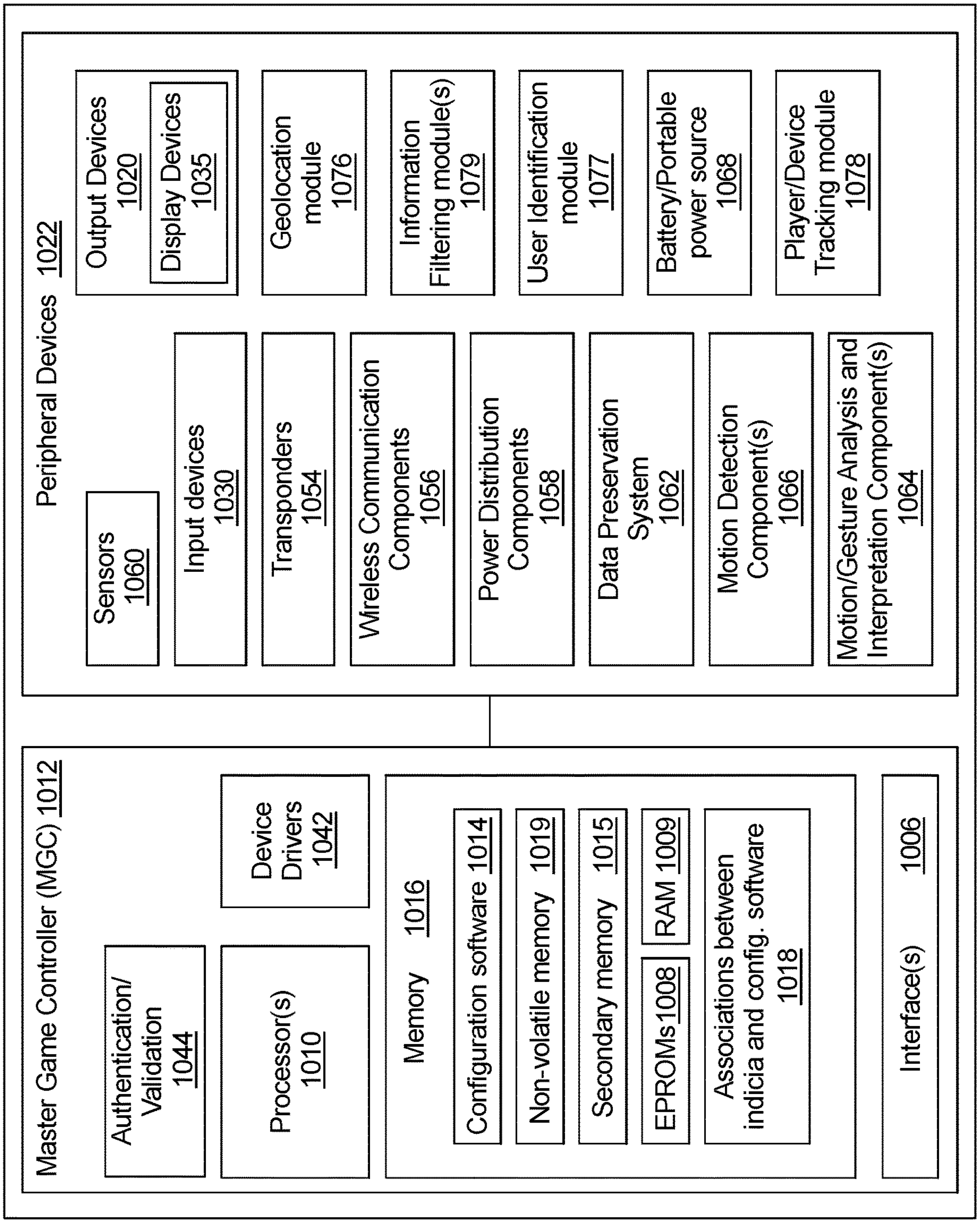
FIG. 3 is a schematic block diagram of one embodiment of an electronic configuration of an example gaming system of the present disclosure.

FIG. 3 is a block diagram of an example EGM 1000 and FIGS. 4A and 4B include two different example EGMs 2000*a* and 2000*b*. The EGMs 1000, 2000*a*, and 2000*b* are merely example EGMs, and different EGMs may be implemented using different combinations of the components shown in the EGMs 1000, 2000*a*, and 2000*b*. Although the below refers to EGMs, in various embodiments personal gaming devices may include some or all of the below components.

In these embodiments, the EGM 1000 includes a master gaming controller 1012 configured to communicate with and to operate with a plurality of peripheral devices 1022.

The master gaming controller 1012 includes at least one processor 1010. The at least one processor 1010 is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information or game information) via a communication interface 1006 of the master gaming controller 1012; (2) converting signals read by an interface to a format corresponding to that used by software or memory of the EGM; (3) accessing memory to configure or reconfigure game parameters in the memory according to indicia read from the EGM; (4) communicating with interfaces and the peripheral devices 1022 (such as input/output devices); and/or (5) controlling the peripheral devices 1022. In certain embodiments, one or more components of the master gaming controller 1012 (such as the at least one processor 1010) reside within a housing of the EGM (described below), while in other embodiments at least one component of the master gaming controller 1012 resides outside of the housing of the EGM.

The master gaming controller 1012 also includes at least one memory device 1016, which includes: (1) volatile memory (e.g., RAM 1009, which can include non-volatile RAM, magnetic RAM, ferroelectric RAM, and any other suitable forms); (2) non-volatile memory 1019 (e.g., disk memory, FLASH memory, EPROMs, EEPROMs, memristor-based non-volatile solid-state memory, etc.); (3) unalterable memory (e.g., EPROMs 1008); (4) read-only memory; and/or (5) a secondary memory storage device 1015, such as a non-volatile memory device, configured to store gaming software related information (the gaming software related information and the memory may be used to store various audio files and games not currently being used and invoked in a configuration or reconfiguration). Any other suitable magnetic, optical, and/or semiconductor memory may operate in conjunction with the EGM of the present disclosure. In certain embodiments, the at least one memory device 1016 resides within the housing of the EGM (described below), while in other embodiments at least one component of the at least one memory device 1016 resides outside of the housing of the EGM.

The at least one memory device 1016 is configured to store, for example: (1) configuration software 1014, such as all the parameters and settings for a game playable on the EGM; (2) associations 1018 between configuration indicia read from an EGM with one or more parameters and settings; (3) communication protocols configured to enable the at least one processor 1010 to communicate with the peripheral devices 1022; and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the EGM to communicate with local and non-local devices using such protocols. In one implementation, the master gaming controller 1012 communicates with other devices using a serial communication protocol. A few non-limiting examples of serial communication protocols that other devices, such as peripherals (e.g., a bill validator or a ticket printer), may use to communicate with the master game controller 1012 include USB, RS-232, and Netplex (a proprietary protocol developed by IGT).

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Computer program code for carrying out operations for aspects of the present disclosure may be written in any combination of one or more programming languages, including an object oriented programming language such as Java, Scala, Smalltalk, Eiffel, JADE, Emerald, C++, C #, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In certain embodiments, the at least one memory device 1016 is configured to store program code and instructions executable by the at least one processor of the EGM to control the EGM. The at least one memory device 1016 of the EGM also stores other operating data, such as image data, event data, input data, random number generators (RNGs) or pseudo-RNGs, paytable data or information, and/or applicable game rules that relate to the play of one or more games on the EGM. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an Internet or intranet).

The at least one memory device 1016 also stores a plurality of device drivers 1042. Examples of different types of device drivers include device drivers for EGM components and device drivers for the peripheral components 1022. Typically, the device drivers 1042 utilize various communication protocols that enable communication with a particular physical device. The device driver abstracts the hardware implementation of that device. For example, a device driver may be written for each type of card reader that could potentially be connected to the EGM. Non-limiting examples of communication protocols used to implement the device drivers include Netplex, USB, Serial, Ethernet 175, Firewire, I/O debouncer, direct memory map, serial, PCI, parallel, RF, Bluetooth™, near-field communications (e.g., using near-field magnetics), 802.11 (WiFi), etc. In one embodiment, when one type of a particular device is exchanged for another type of the particular device, the at least one processor of the EGM loads the new device driver from the at least one memory device to enable communication with the new device. For instance, one type of card reader in the EGM can be replaced with a second different type of card reader when device drivers for both card readers are stored in the at least one memory device.

In certain embodiments, the software units stored in the at least one memory device 1016 can be upgraded as needed. For instance, when the at least one memory device 1016 is a hard drive, new games, new game options, new parameters, new settings for existing parameters, new settings for new parameters, new device drivers, and new communication protocols can be uploaded to the at least one memory device 1016 from the master game controller 1012 or from some other external device. As another example, when the at least one memory device 1016 includes a CD/DVD drive including a CD/DVD configured to store game options, parameters, and settings, the software stored in the at least one memory device 1016 can be upgraded by replacing a first CD/DVD with a second CD/DVD. In yet another example, when the at least one memory device 1016 uses flash memory 1019 or EPROM 1008 units configured to store games, game options, parameters, and settings, the software stored in the flash and/or EPROM memory units can be upgraded by replacing one or more memory units with new memory units that include the upgraded software. In another embodiment, one or more of the memory devices, such as the hard drive, may be employed in a game software download process from a remote software server.

In some embodiments, the at least one memory device 1016 also stores authentication and/or validation components 1044 configured to authenticate/validate specified EGM components and/or information, such as hardware components, software components, firmware components, peripheral device components, user input device components, information received from one or more user input devices, information stored in the at least one memory device 1016, etc. Examples of various authentication and/or validation components are described in U.S. Pat. No. 6,620,047, entitled "Electronic Gaming Apparatus Having Authentication Data Sets".

In certain embodiments, the peripheral devices 1022 include several device interfaces, such as: (1) at least one output device 1020 including at least one display device 1035; (2) at least one input device 1030 (which may include contact and/or non-contact interfaces); (3) at least one transponder 1054; (4) at least one wireless communication component 1056; (5) at least one wired/wireless power distribution component 1058; (6) at least one sensor 1060; (7) at least one data preservation component 1062; (8) at least one motion/gesture analysis and interpretation component 1064; (9) at least one motion detection component 1066; (10) at least one portable power source 1068; (11) at least one geolocation module 1076; (12) at least one user identification module 1077; (13) at least one player/device tracking module 1078; and (14) at least one information filtering module 1079.

The at least one output device 1020 includes at least one display device 1035 configured to display any game(s) displayed by the EGM and any suitable information associated with such game(s). In certain embodiments, the display devices are connected to or mounted on a housing of the EGM (described below). In various embodiments, the display devices serve as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM **2000*a* illustrated in FIG. 4A includes a central display device 2116, a player tracking display 2140, a credit display 2120, and a bet display 2122. The example EGM 2000*b* illustrated in FIG. 4B includes a central display device 2116, an upper display device 2118, a player tracking display 2140, a credit display 2120, and a bet display 2122**.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. The display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, the at least one output device 1020 includes a payout device. In these embodiments, after the EGM receives an actuation of a cashout device (described below), the EGM causes the payout device to provide a payment to the player. In one embodiment, the payout device is one or more of: (a) a ticket printer and dispenser configured to print and dispense a ticket or credit slip associated with a monetary value, wherein the ticket or credit slip may be redeemed for its monetary value via a cashier, a kiosk, or other suitable redemption system; (b) a bill dispenser configured to dispense paper currency; (c) a coin dispenser configured to dispense coins or tokens (such as into a coin payout tray); and (d) any suitable combination thereof. The example EGMs 2000*a* and 2000*b* illustrated in FIGS. 4A and 4B each include a ticket printer and dispenser 2136. Examples of ticket-in ticket-out (TITO) technology are described in U.S. Pat. No. 5,429,361, entitled "Gaming Machine Information, Communication and Display System"; U.S. Pat. No. 5,470,079, entitled "Gaming Machine Accounting and Monitoring System"; U.S. Pat. No. 5,265,874, entitled "Cashless Gaming Apparatus and Method"; U.S. Pat. No. 6,729,957, entitled "Gaming Method and Host Computer with Ticket-In/Ticket-Out Capability"; U.S. Pat. No. 6,729,958, entitled "Gaming System with Ticket-In/Ticket-Out Capability"; U.S. Pat. No. 6,736,725, entitled "Gaming Method and Host Computer with Ticket-In/Ticket-Out Capability"; U.S. Pat. No. 7,275,991, entitled "Slot Machine with Ticket-In/Ticket-Out Capability"; and U.S. Pat. No. 6,048,269, entitled "Coinless Slot Machine System and Method".

In certain embodiments, rather than dispensing bills, coins, or a physical ticket having a monetary value to the player following receipt of an actuation of the cashout device, the payout device is configured to cause a payment to be provided to the player in the form of an electronic funds transfer, such as via a direct deposit into a bank account, a casino account, or a prepaid account of the player; via a transfer of funds onto an electronically recordable identification card or smart card of the player; or via sending a virtual ticket having a monetary value to an electronic device of the player. Examples of providing payment using virtual tickets are described in U.S. Pat. No. 8,613,659, entitled "Virtual Ticket-In and Ticket-Out on a Gaming Machine".

While any credit balances, any wagers, any values, and any awards are described herein as amounts of monetary credits or currency, one or more of such credit balances, such wagers, such values, and such awards may be for non-monetary credits, promotional credits, of player tracking points or credits.

In certain embodiments, the at least one output device 1020 is a sound generating device controlled by one or more sound cards. In one such embodiment, the sound generating device includes one or more speakers or other sound generating hardware and/or software configured to generate sounds, such as by playing music for any games or by playing music for other modes of the EGM, such as an attract mode. The example EGMs 2000*a* and 2000*b* illustrated in FIGS. 4A and 4B each include a plurality of speakers 2150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

The at least one input device 1030 may include any suitable device that enables an input signal to be produced and received by the at least one processor 1010 of the EGM.

In one embodiment, the at least one input device 1030 includes a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. The example EGMs 2000*a* and 2000*b* illustrated in FIGS. 4A and 4B each include a combined bill and ticket acceptor 2128 and a coin slot 2126.

In one embodiment, the at least one input device 1030 includes a payment device configured to enable the EGM to be funded via an electronic funds transfer, such as a transfer of funds from a bank account. In another embodiment, the EGM includes a payment device configured to communicate with a mobile device of a player, such as a mobile phone, a radio frequency identification tag, or any other suitable wired or wireless device, to retrieve relevant information associated with that player to fund the EGM. Examples of funding an EGM via communication between the EGM and a mobile device (such as a mobile phone) of a player are described in U.S. Patent Application Publication No. 2013/0344942, entitled "Avatar as Security Measure for Mobile Device Use with Electronic Gaming Machine". When the EGM is funded, the at least one processor determines the amount of funds entered and displays the corresponding amount on a credit display or any other suitable display as described below.

In certain embodiments, the at least one input device 1030 includes at least one wagering or betting device. In various embodiments, the one or more wagering or betting devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). One such wagering or betting device is as a maximum wager or bet device that, when actuated, causes the EGM to place a maximum wager on a play of a game. Another such wagering or betting device is a repeat bet device that, when actuated, causes the EGM to place a wager that is equal to the previously-placed wager on a play of a game. A further such wagering or betting device is a bet one device that, when actuated, causes the EGM to increase the wager by one credit. Generally, upon actuation of one of the wagering or betting devices, the quantity of credits displayed in a credit meter (described below) decreases by the amount of credits wagered, while the quantity of credits displayed in a bet display (described below) increases by the amount of credits wagered.

In various embodiments, the at least one input device 1030 includes at least one game play activation device. In various embodiments, the one or more game play initiation devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). After a player appropriately funds the EGM and places a wager, the EGM activates the game play activation device to enable the player to actuate the game play activation device to initiate a play of a game on the EGM (or another suitable sequence of events associated with the EGM). After the EGM receives an actuation of the game play activation device, the EGM initiates the play of the game. The example EGMs **2000*a* and 2000*b* illustrated in FIGS. 4A and 4B each include a game play activation device in the form of a game play initiation button 2132**. In other embodiments, the EGM begins game play automatically upon appropriate funding rather than upon utilization of the game play activation device.

In other embodiments, the at least one input device 1030 includes a cashout device. In various embodiments, the cashout device is: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). When the EGM receives an actuation of the cashout device from a player and the player has a positive (i.e., greater-than-zero) credit balance, the EGM initiates a payout associated with the player's credit balance. The example EGMs **2000*a* and 2000*b* illustrated in FIGS. 4A and 4B each include a cashout device in the form of a cashout button 2134**.

In various embodiments, the at least one input device 1030 includes a plurality of buttons that are programmable by the EGM operator to, when actuated, cause the EGM to perform particular functions. For instance, such buttons may be hard keys, programmable soft keys, or icons icon displayed on a display device of the EGM (described below) that are actuatable via a touch screen of the EGM (described below) or via use of a suitable input device of the EGM (such as a mouse or a joystick). The example EGMs **2000*a* and 2000*b* illustrated in FIGS. 4A and 4B each include a plurality of such buttons 2130**.

In certain embodiments, the at least one input device 1030 includes a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In embodiments including a player tracking system, as further described below, the at least one input device 1030 includes a card reader in communication with the at least one processor of the EGM. The example EGMs **2000*a* and 2000*b* illustrated in FIGS. 4A and 4B each include a card reader 2138**. The card reader is configured to read a player identification card inserted into the card reader.

The at least one wireless communication component 1056 includes one or more communication interfaces having different architectures and utilizing a variety of protocols, such as (but not limited to) 802.11 (WiFi); 802.15 (including Bluetooth™); 802.16 (WiMax); 802.22; cellular standards such as CDMA, CDMA2000, and WCDMA; Radio Frequency (e.g., RFID); infrared; and Near Field Magnetic communication protocols. The at least one wireless communication component 1056 transmits electrical, electromagnetic, or optical signals that carry digital data streams or analog signals representing various types of information.

The at least one wired/wireless power distribution component 1058 includes components or devices that are configured to provide power to other devices. For example, in one embodiment, the at least one power distribution component 1058 includes a magnetic induction system that is configured to provide wireless power to one or more user input devices near the EGM. In one embodiment, a user input device docking region is provided, and includes a power distribution component that is configured to recharge a user input device without requiring metal-to-metal contact. In one embodiment, the at least one power distribution component 1058 is configured to distribute power to one or more internal components of the EGM, such as one or more rechargeable power sources (e.g., rechargeable batteries) located at the EGM.

In certain embodiments, the at least one sensor 1060 includes at least one of: optical sensors, pressure sensors, RF sensors, infrared sensors, image sensors, thermal sensors, and biometric sensors. The at least one sensor 1060 may be used for a variety of functions, such as: detecting movements and/or gestures of various objects within a predetermined proximity to the EGM; detecting the presence and/or identity of various persons (e.g., players, casino employees, etc.), devices (e.g., user input devices), and/or systems within a predetermined proximity to the EGM.

The at least one data preservation component 1062 is configured to detect or sense one or more events and/or conditions that, for example, may result in damage to the EGM and/or that may result in loss of information associated with the EGM. Additionally, the data preservation system 1062 may be operable to initiate one or more appropriate action(s) in response to the detection of such events/conditions.

The at least one motion/gesture analysis and interpretation component 1064 is configured to analyze and/or interpret information relating to detected player movements and/or gestures to determine appropriate player input information relating to the detected player movements and/or gestures. For example, in one embodiment, the at least one motion/gesture analysis and interpretation component 1064 is configured to perform one or more of the following functions: analyze the detected gross motion or gestures of a player; interpret the player's motion or gestures (e.g., in the context of a casino game being played) to identify instructions or input from the player; utilize the interpreted instructions/input to advance the game state; etc. In other embodiments, at least a portion of these additional functions may be implemented at a remote system or device.

The at least one portable power source 1068 enables the EGM to operate in a mobile environment. For example, in one embodiment, the EGM 300 includes one or more rechargeable batteries.

The at least one geolocation module 1076 is configured to acquire geolocation information from one or more remote sources and use the acquired geolocation information to determine information relating to a relative and/or absolute position of the EGM. For example, in one implementation, the at least one geolocation module 1076 is configured to receive GPS signal information for use in determining the position or location of the EGM. In another implementation, the at least one geolocation module 1076 is configured to receive multiple wireless signals from multiple remote devices (e.g., EGMs, servers, wireless access points, etc.) and use the signal information to compute position/location information relating to the position or location of the EGM.

The at least one user identification module 1077 is configured to determine the identity of the current user or current owner of the EGM. For example, in one embodiment, the current user is required to perform a login process at the EGM in order to access one or more features. Alternatively, the EGM is configured to automatically determine the identity of the current user based on one or more external signals, such as an RFID tag or badge worn by the current user and that provides a wireless signal to the EGM that is used to determine the identity of the current user. In at least one embodiment, various security features are incorporated into the EGM to prevent unauthorized users from accessing confidential or sensitive information.

The at least one information filtering module 1079 is configured to perform filtering (e.g., based on specified criteria) of selected information to be displayed at one or more displays 1035 of the EGM.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. U.S. Pat. No. 7,290,072 describes a variety of EGMs including one or more communication ports that enable the EGMs to communicate and operate with one or more external peripherals.

As generally described above, in certain embodiments, such as the example EGMs 2000*a* and 2000*b* illustrated in FIGS. 4A and 4B, the EGM has a support structure, housing, or cabinet that provides support for a plurality of the input devices and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs 2000*a* and 2000*b* shown in FIGS. 4A and 4B, EGMs may have varying housing and display configurations.

In certain embodiments, the EGM is a device that has obtained approval from a regulatory gaming commission, and in other embodiments, the EGM is a device that has not obtained approval from a regulatory gaming commission.

The EGMs described above are merely three examples of different types of EGMs. Certain of these example EGMs may include one or more elements that may not be included in all gaming systems, and these example EGMs may not include one or more elements that are included in other gaming systems. For example, certain EGMs include a coin acceptor while others do not.

Operation of Primary or Base Games and/or Secondary or Bonus Games

In various embodiments, an EGM may be implemented in one of a variety of different configurations. In various embodiments, the EGM may be implemented as one of: (a) a dedicated EGM in which computerized game programs executable by the EGM for controlling any primary or base games (referred to herein as "primary games") and/or any secondary or bonus games or other functions (referred to herein as "secondary games") displayed by the EGM are provided with the EGM before delivery to a gaming establishment or before being provided to a player; and (b) a changeable EGM in which computerized game programs executable by the EGM for controlling any primary games and/or secondary games displayed by the EGM are downloadable or otherwise transferred to the EGM through a data network or remote communication link; from a USB drive, flash memory card, or other suitable memory device; or in any other suitable manner after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award. Examples of this type of award evaluation are described in U.S. Pat. No. 7,470,183, entitled “Finite Pool Gaming Method and Apparatus”; U.S. Pat. No. 7,563,163, entitled “Gaming Device Including Outcome Pools for Providing Game Outcomes”; U.S. Pat. No. 7,833,092, entitled “Method and System for Compensating for Player Choice in a Game of Chance”; U.S. Pat. No. 8,070,579, entitled “Bingo System with Downloadable Common Patterns”; and U.S. Pat. No. 8,398,472, entitled “Central Determination Poker Game”.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. Examples of this type of award determination are described in U.S. Pat. No. 7,753,774, entitled “Using Multiple Bingo Cards to Represent Multiple Slot Paylines and Other Class III Game Options”; U.S. Pat. No. 7,731,581, entitled “Multi-Player Bingo Game with Multiple Alternative Outcome Displays”; U.S. Pat. No. 7,955,170, entitled “Providing Non-Bingo Outcomes for a Bingo Game”; U.S. Pat. No. 8,070,579, entitled “Bingo System with Downloadable Common Patterns”; and U.S. Pat. No. 8,500,538, entitled “Bingo Gaming System and Method for Providing Multiple Outcomes from Single Bingo Pattern”.

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host. In this embodiment, the accounting and gaming information system includes: (a) a player database configured to store player profiles, (b) a player tracking module configured to track players (as described below), and (c) a credit system configured to provide automated transactions. Examples of such accounting systems are described in U.S. Pat. No. 6,913,534, entitled “Gaming Machine Having a Lottery Game and Capability for Integration with Gaming Device Accounting System and Player Tracking System,” and U.S. Pat. No. 8,597,116, entitled “Virtual Player Tracking and Related Services”.

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. The example EGM **2000*b* shown in FIG. 4B includes a payline 1152 and a plurality of reels 1154**. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display areas, the gaming system enables a wager to be placed on a plurality of symbol display areas, which activates those symbol display areas.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided. Examples of ways to win award determinations are described in U.S. Pat. No. 8,012,011, entitled "Gaming Device and Method Having Independent Reels and Multiple Ways of Winning"; U.S. Pat. No. 8,241,104, entitled "Gaming Device and Method Having Designated Rules for Determining Ways To Win"; and U.S. Pat. No. 8,430,739, entitled "Gaming System and Method Having Wager Dependent Different Symbol Evaluations".

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award. Examples of progressive gaming systems are described in U.S. Pat. No. 7,585,223, entitled "Server Based Gaming System Having Multiple Progressive Awards"; U.S. Pat. No. 7,651,392, entitled "Gaming Device System Having Partial Progressive Payout"; U.S. Pat. No. 7,666,093, entitled "Gaming Method and Device Involving Progressive Wagers"; U.S. Pat. No. 7,780,523, entitled "Server Based Gaming System Having Multiple Progressive Awards"; and U.S. Pat. No. 8,337,298, entitled "Gaming Device Having Multiple Different Types of Progressive Awards".

As generally noted above, in addition to providing winning credits or other awards for one or more plays of the primary game(s), in various embodiments the gaming system provides credits or other awards for one or more plays of one or more secondary games. The secondary game typically enables an award to be obtained addition to any award obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). The secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. Any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for providing the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. Examples of group gaming systems are described in U.S. Pat. No. 8,070,583, entitled "Server Based Gaming System and Method for Selectively Providing One or More Different Tournaments"; U.S. Pat. No. 8,500,548, entitled "Gaming System and Method for Providing Team Progressive Awards"; and U.S. Pat. No. 8,562,423, entitled "Method and Apparatus for Rewarding Multiple Game Players for a Single Win".

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a mobile phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. Examples of player tracking systems are described in U.S. Pat. No. 6,722,985, entitled "Universal Player Tracking System"; U.S. Pat. No. 6,908,387, entitled "Player Tracking Communication Mechanisms in a Gaming Machine"; U.S. Pat. No. 7,311,605, entitled "Player Tracking Assembly for Complete Patron Tracking for Both Gaming and Non-Gaming Casino Activity"; U.S. Pat. No. 7,611,411, entitled "Player Tracking Instruments Having Multiple Communication Modes"; U.S. Pat. No. 7,617,151, entitled "Alternative Player Tracking Techniques"; and U.S. Pat. No. 8,057,298, entitled "Virtual Player Tracking and Related Services".

Web-Based Gaming

In various embodiments, the gaming system includes one or more servers configured to communicate with a personal gaming device-such as a smartphone, a tablet computer, a desktop computer, or a laptop computer-to enable web-based game play using the personal gaming device. In various embodiments, the player must first access a gaming website via an Internet browser of the personal gaming device or execute an application (commonly called an "app") installed on the personal gaming device before the player can use the personal gaming device to participate in web-based game play. In certain embodiments, the one or more servers and the personal gaming device operate in a thin-client environment. In these embodiments, the personal gaming device receives inputs via one or more input devices (such as a touch screen and/or physical buttons), the personal gaming device sends the received inputs to the one or more servers, the one or more servers make various determinations based on the inputs and determine content to be displayed (such as a randomly determined game outcome and corresponding award), the one or more servers send the content to the personal gaming device, and the personal gaming device displays the content.

In certain such embodiments, the one or more servers must identify the player before enabling game play on the personal gaming device (or, in some embodiments, before enabling monetary wager-based game play on the personal gaming device). In these embodiments, the player must identify herself to the one or more servers, such as by inputting the player's unique username and password combination (or in any other manners described above.

Once identified, the one or more servers enable the player to establish an account balance from which the player can draw credits usable to wager on plays of a game. In certain embodiments, the one or more servers enable the player to initiate an electronic funds transfer to transfer funds from a bank account to the player's account balance. In other embodiments, the one or more servers enable the player to make a payment using the player's credit card, debit card, or other suitable device to add money to the player's account balance. In other embodiments, the one or more servers enable the player to add money to the player's account balance via a peer-to-peer type application, such as PayPal or Venmo. The one or more servers also enable the player to cash out the player's account balance (or part of it) in any suitable manner, such as via an electronic funds transfer or by initiating creation of a paper check that is mailed to the player.

In certain embodiments, the one or more servers include a payment server that handles establishing and cashing out players' account balances and a separate game server configured to determine the outcome and any associated award for a play of a game. In these embodiments, the game server is configured to communicate with the personal gaming device and the payment device, and the personal gaming device and the payment device are not configured to directly communicate with one another. In these embodiments, when the game server receives data representing a request to start a play of a game at a desired wager, the game server sends data representing the desired wager to the payment server. The payment server determines whether the player's account balance can cover the desired wager (i.e., includes a monetary balance at least equal to the desired wager).

If the payment server determines that the player's account balance cannot cover the desired wager, the payment server notifies the game server, which then instructs the personal gaming device to display a suitable notification to the player that the player's account balance is too low to place the desired wager. If the payment server determines that the player's account balance can cover the desired wager, the payment server deducts the desired wager from the account balance and notifies the game server. The game server then determines an outcome and any associated award for the play of the game. The game server notifies the payment server of any nonzero award, and the payment server increases the player's account balance by the nonzero award. The game server sends data representing the outcome and any award to the personal gaming device, which displays the outcome and any award.

In certain embodiments, the one or more servers enable web-based game play using a personal gaming device only if the personal gaming device satisfies one or more jurisdictional requirements. In one embodiment, the one or more servers enable web-based game play using the personal gaming device only if the personal gaming device is located within a designated geographic area (such as within certain state or county lines). In this embodiment, the geolocation module of the personal gaming device determines the location of the personal gaming device and sends the location to the one or more servers, which determine whether the personal gaming device is located within the designated geographic area. In various embodiments, the one or more servers enable non-monetary wager-based game play if the personal gaming device is located outside of the designated geographic area.

In various embodiments, the gaming system includes an EGM configured to communicate with a personal gaming device-such as a smartphone, a tablet computer, a desktop computer, or a laptop computer-to enable tethered mobile game play using the personal gaming device. Generally, in these embodiments, the EGM establishes communication with the personal gaming device and enables the player to play games on the EGM remotely via the personal gaming device. In certain embodiments, the gaming system includes a geo-fence system that enables tethered game play within a particular geographic area but not outside of that geographic area. Examples of tethering an EGM to a personal gaming device and geo-fencing are described in U.S. Patent Appl. Pub. No. 2013/0267324, entitled "Remote Gaming Method Allowing Temporary Inactivation Without Terminating Playing Session Due to Game Inactivity".

Social Network Integration

In certain embodiments, the gaming system is configured to communicate with a social network server that hosts or partially hosts a social networking website via a data network (such as the Internet) to integrate a player's gaming experience with the player's social networking account. This enables the gaming system to send certain information to the social network server that the social network server can use to create content (such as text, an image, and/or a video) and post it to the player's wall, newsfeed, or similar area of the social networking website accessible by the player's connections (and in certain cases the public) such that the player's connections can view that information. This also enables the gaming system to receive certain information from the social network server, such as the player's likes or dislikes or the player's list of connections. In certain embodiments, the gaming system enables the player to link the player's player account to the player's social networking account(s). This enables the gaming system to, once it identifies the player and initiates a gaming session (such as via the player logging in to a website (or an application) on the player's personal gaming device or via the player inserting the player's player tracking card into an EGM), link that gaming session to the player's social networking account(s). In other embodiments, the gaming system enables the player to link the player's social networking account(s) to individual gaming sessions when desired by providing the required login information.

For instance, in one embodiment, if a player wins a particular award (e.g., a progressive award or a jackpot award) or an award that exceeds a certain threshold (e.g., an award exceeding $1,000), the gaming system sends information about the award to the social network server to enable the server to create associated content (such as a screenshot of the outcome and associated award) and to post that content to the player's wall (or other suitable area) of the social networking website for the player's connections to see (and to entice them to play). In another embodiment, if a player joins a multiplayer game and there is another seat available, the gaming system sends that information to the social network sever to enable the server to create associated content (such as text indicating a vacancy for that particular game) and to post that content to the player's wall (or other suitable area) of the social networking website for the player's connections to see (and to entice them to fill the vacancy). In another embodiment, if the player consents, the gaming system sends advertisement information or offer information to the social network server to enable the social network server to create associated content (such as text or an image reflecting an advertisement and/or an offer) and to post that content to the player's wall (or other suitable area) of the social networking website for the player's connections to see. In another embodiment, the gaming system enables the player to recommend a game to the player's connections by posting a recommendation to the player's wall (or other suitable area) of the social networking website.

Differentiating Certain Gaming Systems from General Purpose Computing Devices Certain of the gaming systems described herein, such as EGMs located in a casino or another gaming establishment, include certain components and/or are configured to operate in certain manners that differentiate these systems from general purpose computing devices, i.e., certain personal gaming devices such as desktop computers and laptop computers.

For instance, EGMs are highly regulated to ensure fairness and, in many cases, EGMs are configured to award monetary awards up to multiple millions of dollars. To satisfy security and regulatory requirements in a gaming environment, hardware and/or software architectures are implemented in EGMs that differ significantly from those of general purpose computing devices. For purposes of illustration, a description of EGMs relative to general purpose computing devices and some examples of these additional (or different) hardware and/or software architectures found in EGMs are described below.

At first glance, one might think that adapting general purpose computing device technologies to the gaming industry and EGMs would be a simple proposition because both general purpose computing devices and EGMs employ processors that control a variety of devices. However, due to at least: (1) the regulatory requirements placed on EGMs, (2) the harsh environment in which EGMs operate, (3) security requirements, and (4) fault tolerance requirements, adapting general purpose computing device technologies to EGMs can be quite difficult. Further, techniques and methods for solving a problem in the general purpose computing device industry, such as device compatibility and connectivity issues, might not be adequate in the gaming industry. For instance, a fault or a weakness tolerated in a general purpose computing device, such as security holes in software or frequent crashes, is not tolerated in an EGM because in an EGM these faults can lead to a direct loss of funds from the EGM, such as stolen cash or loss of revenue when the EGM is not operating properly or when the random outcome determination is manipulated.

Certain differences between general purpose computing devices and EGMs are described below. A first difference between EGMs and general purpose computing devices is that EGMs are state-based systems. A state-based system stores and maintains its current state in a non-volatile memory such that, in the event of a power failure or other malfunction, the state-based system can return to that state when the power is restored or the malfunction is remedied. For instance, for a state-based EGM, if the EGM displays an award for a game of chance but the power to the EGM fails before the EGM provides the award to the player, the EGM stores the pre-power failure state in a non-volatile memory, returns to that state upon restoration of power, and provides the award to the player. This requirement affects the software and hardware design on EGMs. General purpose computing devices are not state-based machines, and a majority of data is usually lost when a malfunction occurs on a general purpose computing device.

A second difference between EGMs and general purpose computing devices is that, for regulatory purposes, the software on the EGM utilized to operate the EGM has been designed to be static and monolithic to prevent cheating by the operator of the EGM. For instance, one solution that has been employed in the gaming industry to prevent cheating and to satisfy regulatory requirements has been to manufacture an EGM that can use a proprietary processor running instructions to provide the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used to operate a device during generation of the game of chance, can require burning a new EPROM approved by the gaming jurisdiction and reinstalling the new EPROM on the EGM in the presence of a gaming regulator. Regardless of whether the EPROM solution is used, to gain approval in most gaming jurisdictions, an EGM must demonstrate sufficient safeguards that prevent an operator or a player of an EGM from manipulating the EGM's hardware and software in a manner that gives him an unfair, and in some cases illegal, advantage.

A third difference between EGMs and general purpose computing devices is authentication—EGMs storing code are configured to authenticate the code to determine if the code is unaltered before executing the code. If the code has been altered, the EGM prevents the code from being executed. The code authentication requirements in the gaming industry affect both hardware and software designs on EGMs. Certain EGMs use hash functions to authenticate code. For instance, one EGM stores game program code, a hash function, and an authentication hash (which may be encrypted). Before executing the game program code, the EGM hashes the game program code using the hash function to obtain a result hash and compares the result hash to the authentication hash. If the result hash matches the authentication hash, the EGM determines that the game program code is valid and executes the game program code. If the result hash does not match the authentication hash, the EGM determines that the game program code has been altered (i.e., may have been tampered with) and prevents execution of the game program code. Examples of EGM code authentication are described in U.S. Pat. No. 6,962,530, entitled "Authentication in a Secure Computerized Gaming System"; U.S. Pat. No. 7,043,641, entitled "Encryption in a Secure Computerized Gaming System"; U.S. Pat. No. 7,201,662, entitled "Method and Apparatus for Software Authentication"; and U.S. Pat. No. 8,627,097, entitled "System and Method Enabling Parallel Processing of Hash Functions Using Authentication Checkpoint Hashes".

A fourth difference between EGMs and general purpose computing devices is that EGMs have unique peripheral device requirements that differ from those of a general purpose computing device, such as peripheral device security requirements not usually addressed by general purpose computing devices. For instance, monetary devices, such as coin dispensers, bill validators, and ticket printers and computing devices that are used to govern the input and output of cash or other items having monetary value (such as tickets) to and from an EGM have security requirements that are not typically addressed in general purpose computing devices. Therefore, many general purpose computing device techniques and methods developed to facilitate device connectivity and device compatibility do not address the emphasis placed on security in the gaming industry.

To address some of the issues described above, a number of hardware/software components and architectures are utilized in EGMs that are not typically found in general purpose computing devices. These hardware/software components and architectures, as described below in more detail, include but are not limited to watchdog timers, voltage monitoring systems, state-based software architecture and supporting hardware, specialized communication interfaces, security monitoring, and trusted memory.

Certain EGMs use a watchdog timer to provide a software failure detection mechanism. In a normally-operating EGM, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to enable the operating software to set the timeout interval within a certain range of time. A differentiating feature of some circuits is that the operating software cannot completely disable the function of the watchdog timer. In other words, the watchdog timer always functions from the time power is applied to the board.

Certain EGMs use several power supply voltages to operate portions of the computer circuitry. These can be generated in a central power supply or locally on the computer board. If any of these voltages falls out of the tolerance limits of the circuitry they power, unpredictable operation of the EGM may result. Though most modern general purpose computing devices include voltage monitoring circuitry, these types of circuits only report voltage status to the operating software. Out of tolerance voltages can cause software malfunction, creating a potential uncontrolled condition in the general purpose computing device. Certain EGMs have power supplies with relatively tighter voltage margins than that required by the operating circuitry. In addition, the voltage monitoring circuitry implemented in certain EGMs typically has two thresholds of control. The first threshold generates a software event that can be detected by the operating software and an error condition then generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the EGM.

As described above, certain EGMs are state-based machines. Different functions of the game provided by the EGM (e.g., bet, play, result, points in the graphical presentation, etc.) may be defined as a state. When the EGM moves a game from one state to another, the EGM stores critical data regarding the game software in a custom non-volatile memory subsystem. This ensures that the player's wager and credits are preserved and to minimize potential disputes in the event of a malfunction on the EGM. In general, the EGM does not advance from a first state to a second state until critical information that enables the first state to be reconstructed has been stored. This feature enables the EGM to recover operation to the current state of play in the event of a malfunction, loss of power, etc. that occurred just before the malfunction. In at least one embodiment, the EGM is configured to store such critical information using atomic transactions.

Generally, an atomic operation in computer science refers to a set of operations that can be combined so that they appear to the rest of the system to be a single operation with only two possible outcomes: success or failure. As related to data storage, an atomic transaction may be characterized as series of database operations which either all occur, or all do not occur. Aguarantee of atomicity prevents updates to the database occurring only partially, which can result in data corruption.

To ensure the success of atomic transactions relating to critical information to be stored in the EGM memory before a failure event (e.g., malfunction, loss of power, etc.), memory that includes one or more of the following criteria be used: direct memory access capability; data read/write capability which meets or exceeds minimum read/write access characteristics (such as at least 5.08 Mbytes/sec (Read) and/or at least 38.0 Mbytes/sec (Write)). Memory devices that meet or exceed the above criteria may be referred to as "fault-tolerant" memory devices.

Typically, battery-backed RAM devices may be configured to function as fault-tolerant devices according to the above criteria, whereas flash RAM and/or disk drive memory are typically not configurable to function as fault-tolerant devices according to the above criteria. Accordingly, battery-backed RAM devices are typically used to preserve EGM critical data, although other types of non-volatile memory devices may be employed. These memory devices are typically not used in typical general purpose computing devices.

Thus, in at least one embodiment, the EGM is configured to store critical information in fault-tolerant memory (e.g., battery-backed RAM devices) using atomic transactions. Further, in at least one embodiment, the fault-tolerant memory is able to successfully complete all desired atomic transactions (e.g., relating to the storage of EGM critical information) within a time period of 200 milliseconds or less. In at least one embodiment, the time period of 200 milliseconds represents a maximum amount of time for which sufficient power may be available to the various EGM components after a power outage event has occurred at the EGM.

As described previously, the EGM may not advance from a first state to a second state until critical information that enables the first state to be reconstructed has been atomically stored. After the state of the EGM is restored during the play of a game of chance, game play may resume and the game may be completed in a manner that is no different than if the malfunction had not occurred. Thus, for example, when a malfunction occurs during a game of chance, the EGM may be restored to a state in the game of chance just before when the malfunction occurred. The restored state may include metering information and graphical information that was displayed on the EGM in the state before the malfunction. For example, when the malfunction occurs during the play of a card game after the cards have been dealt, the EGM may be restored with the cards that were previously displayed as part of the card game. As another example, a bonus game may be triggered during the play of a game of chance in which a player is required to make a number of selections on a video display screen. When a malfunction has occurred after the player has made one or more selections, the EGM may be restored to a state that shows the graphical presentation just before the malfunction including an indication of selections that have already been made by the player. In general, the EGM may be restored to any state in a plurality of states that occur in the game of chance that occurs while the game of chance is played or to states that occur between the play of a game of chance.

Game history information regarding previous games played such as an amount wagered, the outcome of the game, and the like may also be stored in a non-volatile memory device. The information stored in the non-volatile memory may be detailed enough to reconstruct a portion of the graphical presentation that was previously presented on the EGM and the state of the EGM (e.g., credits) at the time the game of chance was played. The game history information may be utilized in the event of a dispute. For example, a player may decide that in a previous game of chance that they did not receive credit for an award that they believed they won. The game history information may be used to reconstruct the state of the EGM before, during, and/or after the disputed game to demonstrate whether the player was correct or not in the player's assertion. Examples of a state-based EGM, recovery from malfunctions, and game history are described in U.S. Pat. No. 6,804,763, entitled "High Performance Battery Backed RAM Interface"; U.S. Pat. No. 6,863,608, entitled "Frame Capture of Actual Game Play"; U.S. Pat. No. 7,111,141, entitled "Dynamic NV-RAM"; and U.S. Pat. No. 7,384,339, entitled, "Frame Capture of Actual Game Play".

Another feature of EGMs is that they often include unique interfaces, including serial interfaces, to connect to specific subsystems internal and external to the EGM. The serial devices may have electrical interface requirements that differ from the "standard" EIA serial interfaces provided by general purpose computing devices. These interfaces may include, for example, Fiber Optic Serial, optically coupled serial interfaces, current loop style serial interfaces, etc. In addition, to conserve serial interfaces internally in the EGM, serial devices may be connected in a shared, daisy-chain fashion in which multiple peripheral devices are connected to a single serial channel.

The serial interfaces may be used to transmit information using communication protocols that are unique to the gaming industry. For example, IGT's Netplex is a proprietary communication protocol used for serial communication between EGMs. As another example, SAS is a communication protocol used to transmit information, such as metering information, from an EGM to a remote device. Often SAS is used in conjunction with a player tracking system.

Certain EGMs may alternatively be treated as peripheral devices to a casino communication controller and connected in a shared daisy chain fashion to a single serial interface. In both cases, the peripheral devices are assigned device addresses. If so, the serial controller circuitry must implement a method to generate or detect unique device addresses. General purpose computing device serial ports are not able to do this.

Security monitoring circuits detect intrusion into an EGM by monitoring security switches attached to access doors in the EGM cabinet. Access violations result in suspension of game play and can trigger additional security operations to preserve the current state of game play. These circuits also function when power is off by use of a battery backup. In power-off operation, these circuits continue to monitor the access doors of the EGM. When power is restored, the EGM can determine whether any security violations occurred while power was off, e.g., via software for reading status registers. This can trigger event log entries and further data authentication operations by the EGM software.

Trusted memory devices and/or trusted memory sources are included in an EGM to ensure the authenticity of the software that may be stored on less secure memory subsystems, such as mass storage devices. Trusted memory devices and controlling circuitry are typically designed to not enable modification of the code and data stored in the memory device while the memory device is installed in the EGM. The code and data stored in these devices may include authentication algorithms, random number generators, authentication keys, operating system kernels, etc. The purpose of these trusted memory devices is to provide gaming regulatory authorities a root trusted authority within the computing environment of the EGM that can be tracked and verified as original. This may be accomplished via removal of the trusted memory device from the EGM computer and verification of the secure memory device contents is a separate third party verification device. Once the trusted memory device is verified as authentic, and based on the approval of the verification algorithms included in the trusted device, the EGM is enabled to verify the authenticity of additional code and data that may be located in the gaming computer assembly, such as code and data stored on hard disk drives. Examples of trusted memory devices are described in U.S. Pat. No. 6,685,567, entitled "Process Verification".

In at least one embodiment, at least a portion of the trusted memory devices/sources may correspond to memory that cannot easily be altered (e.g., "unalterable memory") such as EPROMS, PROMS, Bios, Extended Bios, and/or other memory sources that are able to be configured, verified, and/or authenticated (e.g., for authenticity) in a secure and controlled manner.

According to one embodiment, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment, the remote device and the trusted information source may engage in methods using zero knowledge proofs to authenticate each of their respective identities.

EGMs storing trusted information may utilize apparatuses or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected. Examples of trusted memory devices/sources are described in U.S. Pat. No. 7,515,718, entitled "Secured Virtual Network in a Gaming Environment".

Mass storage devices used in a general purpose computing devices typically enable code and data to be read from and written to the mass storage device. In a gaming environment, modification of the gaming code stored on a mass storage device is strictly controlled and would only be enabled under specific maintenance type events with electronic and physical enablers required. Though this level of security could be provided by software, EGMs that include mass storage devices include hardware level mass storage data protection circuitry that operates at the circuit level to monitor attempts to modify data on the mass storage device and will generate both software and hardware error triggers should a data modification be attempted without the proper electronic and physical enablers being present. Examples of using a mass storage device are described in U.S. Pat. No. 6,149,522, entitled "Method of Authenticating Game Data Sets in an Electronic Casino Gaming System".

It should be appreciated that the terminology used herein is for the purpose of describing particular aspects only and is not intended to be limiting of the disclosure. For example, the singular forms "a", "an" and "the" are intended to include the plural forms as well, unless the context clearly indicates otherwise. In another example, the terms "including" and "comprising" and variations thereof, when used in this specification, specify the presence of stated features, steps, operations, elements, and/or components, but do not preclude the presence or addition of one or more other features, steps, operations, elements, components, and/or groups thereof. Additionally, a listing of items does not imply that any or all of the items are mutually exclusive nor does a listing of items imply that any or all of the items are collectively exhaustive of anything or in a particular order, unless expressly specified otherwise. Moreover, as used herein, the term "and/or" includes any and all combinations of one or more of the associated listed items. It should be further appreciated that headings of sections provided in this document and the title are for convenience only, and are not to be taken as limiting the disclosure in any way. Furthermore, unless expressly specified otherwise, devices that are in communication with each other need not be in continuous communication with each other and may communicate directly or indirectly through one or more intermediaries.

In various embodiments, the processes of the present disclosure are represented by a set of instructions stored in one or more memories and executed by one or more processors. Although certain of the processes of the present disclosure are described with reference to one or more flowcharts, many other processes of performing the acts associated with these illustrated processes may be employed. For example, the order of certain of the illustrated blocks or diamonds may be changed, certain of the illustrated blocks or diamonds may be optional, or certain of the illustrated blocks or diamonds may not be employed.

Various changes and modifications to the present embodiments described herein will be apparent to those skilled in the art. For example, a description of an embodiment with several components in communication with each other does not imply that all such components are required, or that each of the disclosed components must communicate with every other component. On the contrary a variety of optional components are described to illustrate the wide variety of possible embodiments of the present disclosure. As such, these changes and modifications can be made without departing from the spirit and scope of the present subject matter and without diminishing its intended technical scope. It is therefore intended that such changes and modifications be covered by the appended claims.

The invention claimed is:

1. A system comprising:

a processor; and a memory device that stores a plurality of instructions that, when executed by the processor independent of any game played in association with a first device, cause the processor to:

associate an action with the first device, wherein the action comprises an order placed at the first device by an unidentified user, and responsive to an occurrence of a termination event at the first device prior to a completion of the action:

disassociate the action from being associated with the first device, enable access of an identification of the action to the unidentified user, after enabling access of the identification of the action to the unidentified user and prior to the unidentified user associating the identification of the action with a different, second device, maintain the action independent of any association with any devices, and responsive to the unidentified user associating the identification of the action with the second device, associate the action with the second device.

2. The system of claim 1, wherein the identification of the action comprises a physical ticket and the association of the identification of the action with the second device comprises the physical ticket being received by the second device.

3. The system of claim 2, wherein the physical ticket comprises a universal ticket voucher.

4. The system of claim 2, wherein the physical ticket being received by the second device comprises the second device reading of a machine readable code from the physical ticket.

5. The system of claim 1, wherein the identification of the action comprises a machine readable code and the association of the identification of the action with the second device comprises the machine readable code being read by the second device.

6. The system of claim 1, wherein the memory devices stores a plurality of further instructions that, when executed by the processor responsive to the action being associated with the second device, cause the processor to communicate data that results in a display device displaying at least one of the action and an identification of the second device.

7. The system of claim 6, wherein the display device comprises a display device of a gaming establishment mobile client.

8. The system of claim 1, wherein the memory devices stores a plurality of further instructions that, when executed by the processor responsive to the action being associated with the second device, cause the processor to communicate data that results in an output device of the second device outputting an indication of the action being associated with the second device.

9. A system comprising:

a processor; and a memory device that stores a plurality of instructions that, when executed by the processor, cause the processor to:

track an activity occurring at a first device, the tracked activity being associated with an unidentified user at the first device, and responsive to an occurrence of a termination event at the first device:

enable access of an identification of the tracked activity to the unidentified user, and responsive to the unidentified user associating the identification of the tracked activity with a different, second device, cause an operational modification of the second device, wherein the operational modification of the second device is based on the tracked activity occurring at the first device.

10. The system of claim 9, wherein the operational modification comprises a modification of an average expected payback percentage of the second device.

11. The system of claim 9, wherein the identification of the tracked activity comprises a physical ticket and the association of the identification of the tracked activity with the second device comprises the physical ticket being received by the second device.

12. The system of claim 9, wherein the identification of the tracked activity comprises a machine readable code and the association of the identification of the tracked activity with the second device comprises the machine readable code being read by the second device.

13. A method of operating a system, the method comprising:

associating, by a processor, an action with a first device, wherein the action comprises an order placed at the first device by an unidentified user, and the association occurs independent of any game played in association with the first device, and responsive to an occurrence of a termination event at the first device prior to a completion of the action:

disassociating, by the processor, the action from being associated with the first device, enabling, by the processor, access of an identification of the action to the unidentified user, after enabling access of the identification of the action to the unidentified user and prior to the unidentified user associating the identification of the action with a different, second device, maintaining, by the processor, the action independent of any association with any devices, and responsive to the unidentified user associating the identification of the action with the second device, associating, by the processor, the action with the second device.

14. The method of claim 13, wherein the identification of the action comprises a physical ticket and the association of the identification of the action with the second device comprises the physical ticket being received by the second device.

15. The method of claim 14, wherein the physical ticket comprises a universal ticket voucher.

16. The method of claim 14, wherein the physical ticket being received by the second device comprises the second device reading of a machine readable code from the physical ticket.

17. The method of claim 13, wherein the identification of the action comprises a machine readable code and the association of the identification of the action with the second device comprises the machine readable code being read by the second device.

18. The method of claim 13, further comprising, responsive to the action being associated with the second device, displaying, by a display device, at least one of the action and an identification of the second device.

19. The method of claim 18, wherein the display device comprises a display device of a gaming establishment mobile client.

20. The method of claim 13, further comprising, responsive to the action being associated with the second device, outputting, by an output device of the second device, an indication of the action being associated with the second device.

* * * * *